(12) United States Patent
Kanade et al.

(10) Patent No.: US 8,152,348 B2
(45) Date of Patent: Apr. 10, 2012

(54) EXTRACTION OF LIGHT FROM A LIGHT CONDUCTING MEDIUM IN A PREFERRED EMANATION PATTERN

(75) Inventors: Udayan Kanade, Pune (IN); Balaji Ganapathy, Atlanta, GA (US)

(73) Assignee: I2iC Corporation, Foster City, CA (US)

( * ) Notice: Subject to any disclaimer, the term of this patent is extended or adjusted under 35 U.S.C. 154(b) by 0 days.

(21) Appl. No.: 11/754,258

(22) Filed: May 25, 2007

(65) Prior Publication Data

US 2008/0007965 A1   Jan. 10, 2008

(30) Foreign Application Priority Data

May 25, 2006   (IN) .......................... 793/MUM/2006

(51) Int. Cl.
*F21V 7/04* (2006.01)
(52) U.S. Cl. ........................ 362/607; 362/629
(58) Field of Classification Search .......... 362/606–607, 362/615, 618, 624, 627, 629
See application file for complete search history.

(56) References Cited

U.S. PATENT DOCUMENTS

| 5,542,017 | A  | * | 7/1996  | Koike .......................... 385/123 |
| 5,649,754 | A  |   | 7/1997  | Matsumoto |
| 6,059,936 | A  |   | 5/2000  | Cathey et al. |
| 6,266,108 | B1 | * | 7/2001  | Bao et al. ........................ 349/63 |
| 6,803,073 | B2 | * | 10/2004 | Doan ............................ 427/212 |
| 6,977,025 | B2 | * | 12/2005 | McArdle et al. ........... 156/272.2 |
| 6,989,873 | B2 | * | 1/2006  | Hua-Nan et al. ............... 349/64 |
| 2004/0136174 | A1 |   | 7/2004  | Yu |
| 2005/0068759 | A1 | * | 3/2005  | Takemoto et al. .............. 362/31 |
| 2006/0056166 | A1 | * | 3/2006  | Yeo et al. ....................... 362/19 |
| 2006/0103051 | A1 |   | 5/2006  | Staats |
| 2006/0103589 | A1 |   | 5/2006  | Chua |
| 2006/0120110 | A1 | * | 6/2006  | Lin et al. ...................... 362/615 |
| 2006/0133109 | A1 | * | 6/2006  | Kim et al. .................... 362/615 |
| 2006/0210726 | A1 |   | 9/2006  | Jones |
| 2007/0031685 | A1 |   | 2/2007  | Ko |
| 2009/0015930 | A1 |   | 1/2009  | Hikmet et al. |

FOREIGN PATENT DOCUMENTS

WO   WO2007049515   *   5/2007
WO   2007/069819        4/2008

* cited by examiner

*Primary Examiner* — Julie Shallenberger

(57) ABSTRACT

An apparatus and method for extraction of light from a light conducting medium in a preferred emanation pattern are described. In one embodiment, the apparatus comprises a first light conducting sheet including aspherical particles, and a light source placed along the edge of the first sheet. The first sheet diffuses light generated by the light source such that light emanates in a predetermined light emanation pattern.

3 Claims, 26 Drawing Sheets

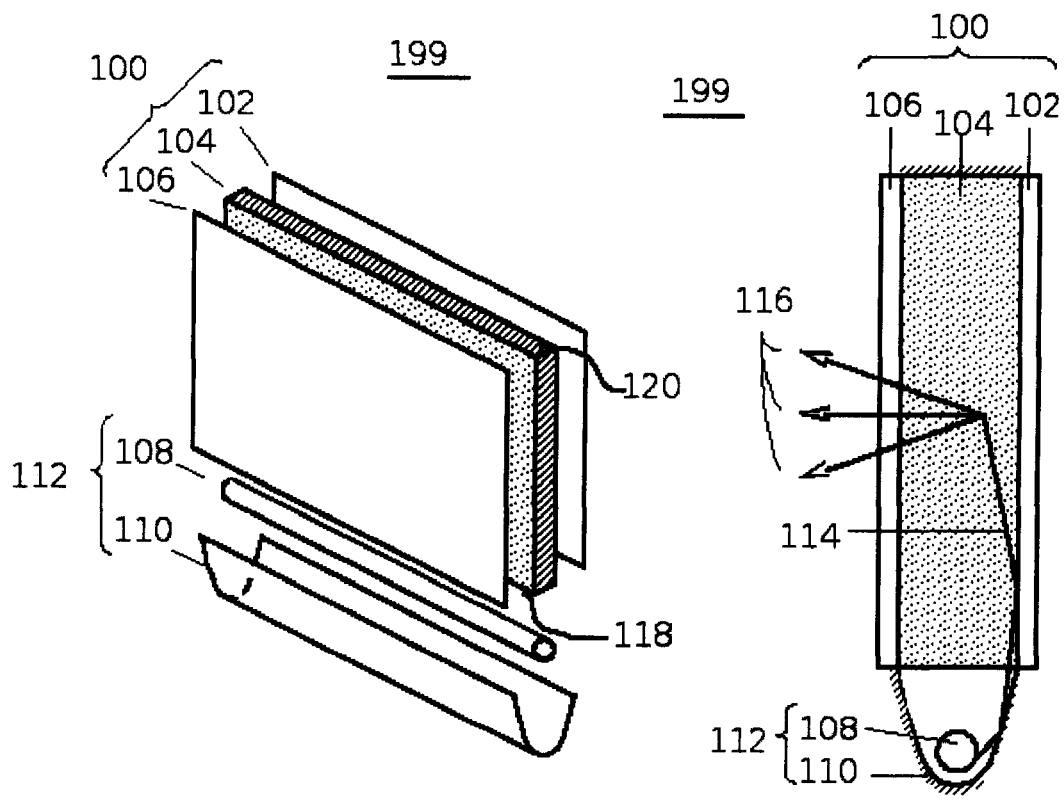
FIG 1A  FIG 1B

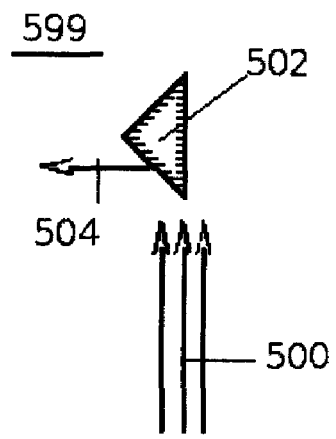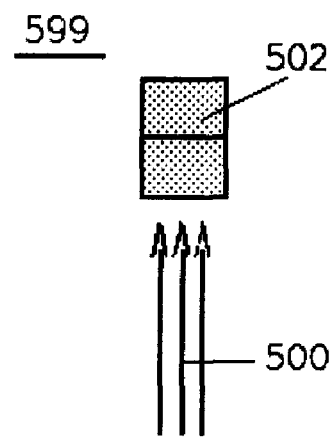
FIG 5A  FIG 5B
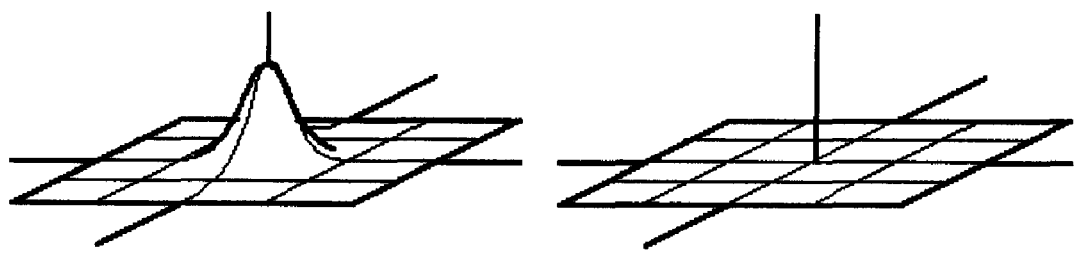
FIG 5C
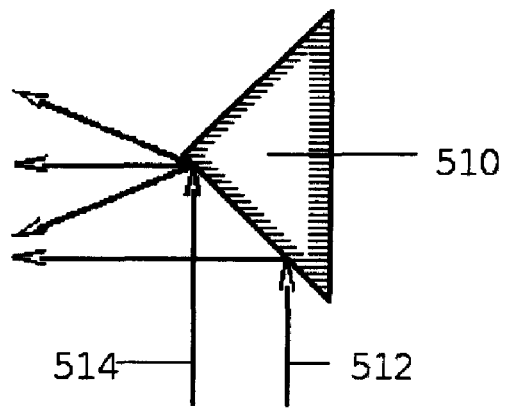
FIG 5D

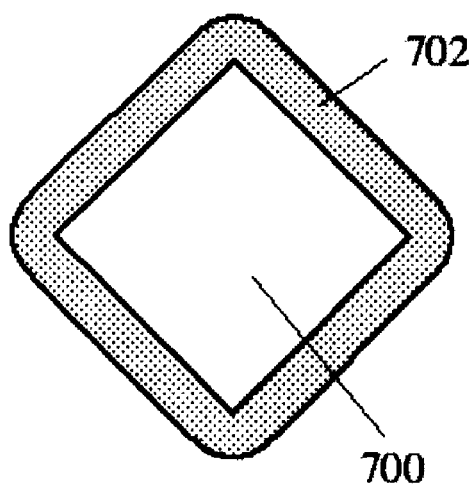
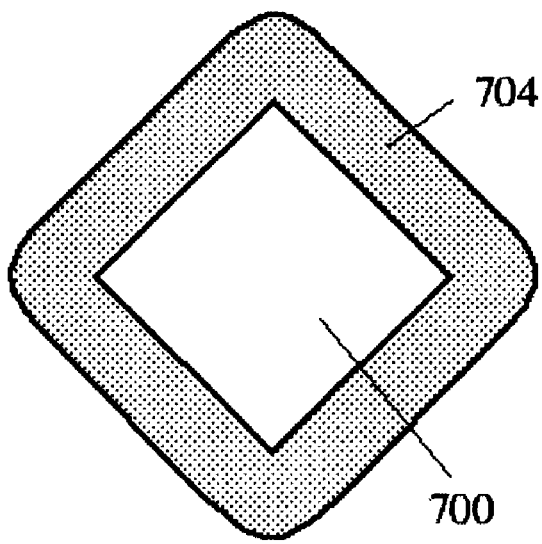
FIG 7A   FIG 7B

900

Insert aspherical particles with a particular orientation property into a liquid base material of a light guide (910)

Solidify the liquid base in presence of an orienting force field. (920)

Optionally, cut light guide out of the created solid (930)

FIG 9

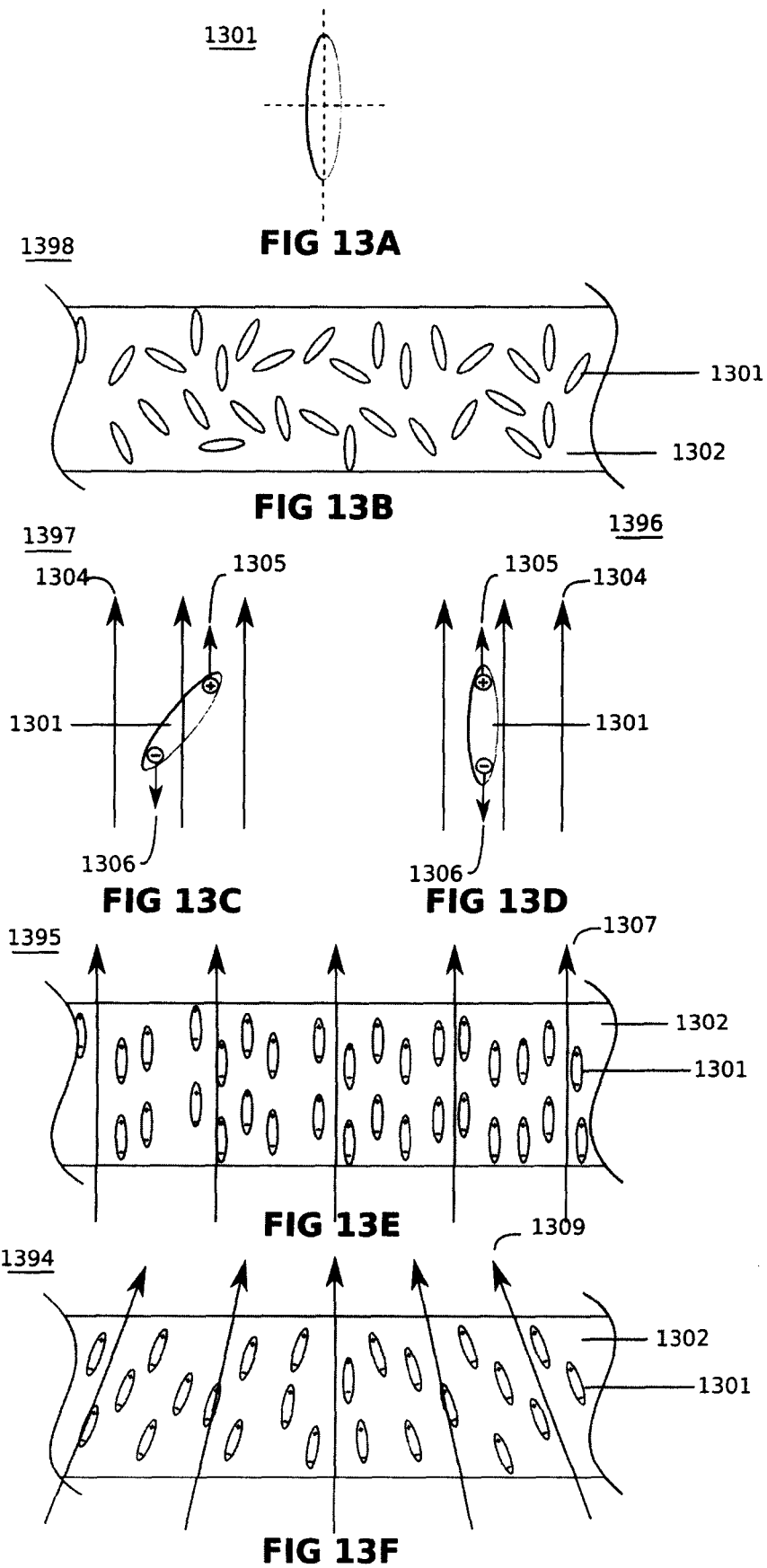

1500
disperse aspherical diffuser particles in base material solution of light guide 1510
allow the solution to crystallize 1520
aspherical particles get trapped in a minimum energy configuration. 1530
FIG 15

1699

1698

1697

1700

```
provide a solid light guide
with aspherical particles
                    1710
```

↓

```
stretch the light guide

1720
```

↓

```
Optionally, cut light guide
out of created solid

```
┌─────────────────────────────────────┐
│ Introduce light diffusing particles │
│ in liquid base material             │
│                              2610   │
└─────────────────────────────────────┘
                  │
                  ▼
┌─────────────────────────────────────┐
│ solidify liquid base material while │
│ migrating diffuser particles        │
│                              2620   │
└─────────────────────────────────────┘
```

FIG 26

EXTRACTION OF LIGHT FROM A LIGHT CONDUCTING MEDIUM IN A PREFERRED EMANATION PATTERN

The present application claims the benefit of and priority to Indian Provisional Patent Application No. 793/MUM/2006 entitled "Method of Extracting Light from Light Conducting Medium According to Preferred Angular Distribution" and filed on May 25, 2006.

FIELD

The present invention relates to an illumination system. Particularly, the invention relates to an apparatus and method for the extraction of light from a light conducting medium in a preferred emanation pattern.

BACKGROUND

Illumination is used to light objects for seeing, as also for photography, microscopy, scientific purposes, entertainment productions (including theatre, television and movies), projection of images and as backlights of displays.

Furthermore, illumination is often required to be directed onto an object in a particular manner. For example, illumination sources for photography need to be diffused, illumination sources for backlights of displays need to be uniform and illumination sources for theatre spotlights need to be highly directional.

For illumination purposes, many systems provide point or single dimensional sources of light. Such systems have many drawbacks: light intensity is very high at the light source compared to the rest of the room or environment, and thus such light sources are hurtful to the eye. Such sources also cast very sharp shadows of objects, which are not pleasing to the eye, and may not be preferred for applications such as photography and entertainment production. Such sources also cause glare on surfaces such as table tops, television front panels and monitor front panels.

Their illumination systems that act as light sources in the form of a surface. Fluorescent lights for home lighting may be covered by diffuser panels to reduce the glare. These systems are bulky. They are also not transparent. Diffusers and diffuse reflectors such as umbrella reflectors are used as light sources for photography and cinematography, but they are only approximations to uniform lighting.

Illuminators in the form of a sheet emanating light in a particular emanation pattern have many applications. One such use is as a backlight for transmissive information displays. A backlight emanating light in a narrow viewing angle saves energy for personal viewing of displays, since lesser light energy is wasted in directions where a viewer is not present.

Systems that are light sources in the form of a surface, emanate light in a desired non uniform pattern. Such systems use optical films such as anisotropic scattering films. These systems are inefficient. Further, they render the light source non transparent.

SUMMARY

An apparatus and method for extraction of light from a light conducting medium in a preferred emanation pattern are described. In one embodiment, the apparatus comprises a first light conducting sheet including aspherical particles, and a light source placed along the edge of the first sheet. The first sheet diffuses light generated by the light source such that light emanates in a predetermined light emanation pattern.

The above and other preferred features, including various details of implementation and combination of elements are more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION OF DRAWINGS

The accompanying drawings, which are included as part of the present specification, illustrate the presently preferred embodiment and together with the general description given above and the detailed description of the preferred embodiment given below serve to explain and teach the principles of the present invention.

FIG. 1A illustrates a schematic diagram, shown in disassembled form, of an exemplary illuminated light guide in the form of a sheet, according to one embodiment.

FIG. 1B illustrates a side view of an exemplary illuminated light guide, shown in assembled form, according to one embodiment.

FIG. 5A illustrates a diagram of light deflection caused by a light deflecting particle, of a right angled isosceles triangular prismatic shape, according to one embodiment.

FIG. 5B illustrates a diagram of light deflection, viewed from the direction of emanating light.

FIG. 5C illustrates an exemplary emanation pattern pertaining to a light deflecting particle, according to one embodiment.

FIG. 5D illustrates a diagram of an exemplary emanation pattern, according to one embodiment of the present invention.

FIG. 7A illustrates a block diagram of an exemplary coated particle, according to one embodiment.

FIG. 7B illustrates a block diagram of changing the thickness of the applied coat, according to one embodiment.

FIG. 9 illustrates a flow diagram of an exemplary process for orienting aspherical particles in a light guide, according to one embodiment.

FIG. 13A illustrates a block diagram of an exemplary aspherical particle, according to one embodiment.

FIG. 13B illustrates a block diagram of an exemplary liquefied light guide, according to one embodiment.

FIG. 13C illustrates a block diagram of an exemplary aspherical particle in a magnetic field, according to one embodiment.

FIG. 13D illustrates a block diagram of an exemplary aspherical particle in an equilibrium position, according to one embodiment.

FIG. 13E illustrates a block diagram of an exemplary solidified light guide, according to one embodiment.

FIG. 13F illustrates a block diagram of an exemplary solidified light guide subjected to a magnetic field, according one embodiment.

FIG. 15 illustrates a flow diagram of an exemplary process for orienting aspherical particles in a light guide, according to one embodiment.

FIG. 17A illustrates a flow diagram of an exemplary process for orienting aspherical particles in a light guide, according to one embodiment.

FIG. 26 illustrates a flow diagram of an exemplary process for creating a concentration profile of particles in a light guide, according to one embodiment.

DETAILED DESCRIPTION

Figure 2A:
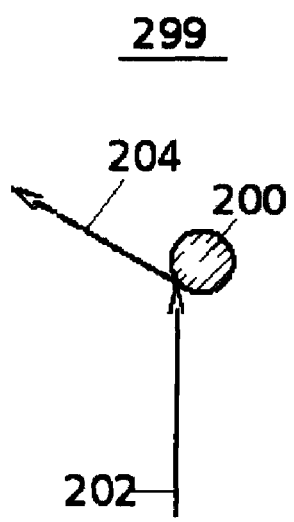
FIG. 2A illustrates a block diagram of an exemplary light deflecting particle, according to one embodiment.

An apparatus and method for extraction of light from a light conducting medium in a preferred emanation pattern have been described. In one embodiment, the apparatus comprises a first light conducting sheet including aspherical particles, and a light source placed along the edge of the first sheet. The first sheet diffuses light generated by the light source such that light emanates in a predetermined light emanation pattern.

A light conducting medium with a preferred distribution of the extracted light with respect to its direction of emanation is described. In an embodiment, the light conducting medium is an illuminated light guide, with a fine dispersion of light deflecting particles.

FIG. 1A illustrates a schematic diagram, shown in disassembled form, of an illuminated light guide in the form of a sheet 199 with means of extracting light, according to an embodiment of the present invention. Light source 199 is primarily transparent and may have a light guide 100 with a core 104 surrounded by low index cladding sheets 102 and 106. The core 104 includes a diffuser, which is a sparse distribution of light dispersing particles. The diffuser in the core 104 is made up of metallic, organic, or other powder, or pigment, which reflects light incident on it. Alternatively, the diffuser in the core 104 may be constituted of small transparent particles or bubbles, which disperse light by refraction, reflection at the boundary, by diffusion inside the particle, or by total internal reflection. Linear light source 108 illuminates the light guide 100 from bottom edge 118. Top edge 120 does not have a reflective surface. Reflector 110 concentrates light from the linear light source 108 into the light guide 100. The light from a primary light source 108 is dispersed over the entire surface of the light guide 100 and exits from its large faces. The light guide 100 is thus primarily transparent and clear when viewed from one of its faces.

FIG. 1B illustrates a side view of illuminated light guide 199, shown in assembled form, according to one embodiment. A light guide 100 is made up out of three sheets joined at their larger faces, each one transparent to light, the central sheet 104 (henceforth referred to as the core) being of higher refractive index than the two side sheets 102 and 106 (henceforth referred to as the cladding). The core 104 preferably has three of its edges made so as to reflect light. Adjacent to the non-reflective edge is an edge illuminator 112. Edge illuminator 112 consists of a primary light source 108 and a reflector 110. The primary light source 108 is a linear source of light. The primary light source 108 could be a fluorescent or gas discharge tube, or a bank of LEDs, or an incandescent filament, or any other similar light source. The reflector 110 is disposed so as to direct a maximum amount of light from the primary light source 108 into the core 104 such that it travels inside the core 104 at an angle parallel or almost parallel to the cladding sheets 102 and 106. A ray of light 114 is an exemplary light ray emanating from the edge illuminator 112 and traveling through the bulk of core 104. Since the ray 114 is at a glancing angle with respect to the claddings 102 and 106, it is kept inside the core 104 by total internal reflection. The three reflecting edges of the core 104 also keep the ray of light inside the core 104. A fine dispersion of light deflecting particles is provided throughout the core 104, at a very small concentration. After traveling a certain distance, the ray of light 114 comes close to a light deflecting particle. This light deflecting particle changes the angle at which the light 114 is traveling through the core 104, such that at least some of the light 114 is now traveling at an angle such that it will not get totally internally reflected at the cladding sheets 106 and 102. This light with a changed angle of travel emanates out of the light guide 100 as emanating light 116.

The systems and methods disclosed are applicable to various embodiments of the light conducting medium. For example, the light conducting medium may be a cylindrical or rectangular light guide instead of a light guide in the form of a sheet 100. Such light guides, oriented along a single linear axis, are usually termed as optical fibers. The light conducting medium may also have a bulk of transparent material through which light is traveling. Light may be contained within the light conducting medium by total internal reflection, as described with reference to FIG. 1B, or complete reflection, or any other optical principle. It is also possible that there are light containment structures. In this case, some light may be lost due to non-containment. Such loss may be minimized by focusing the light emanating from a light source (such as edge illuminator 112) such that a large quantity of light travels through the light conducting medium. Focusing the light may be achieved by reflectors or lenses. Systems providing highly directional light output such as lasers and directional light emitting diodes may also be used. More than one light source may be used.

In the light conducting medium, such as core 104, a fine dispersion of light deflecting particles is provided. The concentration of light deflecting particles may be the same at all locations of the light conducting medium, or may be different at different locations of the light conducting medium, the latter enabling uniform or preferred extraction of light from the light conducting medium.

The light deflecting particles, of which a fine dispersion is provided throughout the light conducting medium 104, deflect light using optical reflection, optical refraction, optical diffraction, optical dispersion or a combination of these.

FIG. 2A illustrates a block diagram of an exemplary light deflecting particle 299, according to one embodiment. Light deflecting particle 200 reflects incoming light ray 202 to the outgoing light ray 204. The particle 200 may be a metallic spheroid with a smooth surface.

Figure 2B:
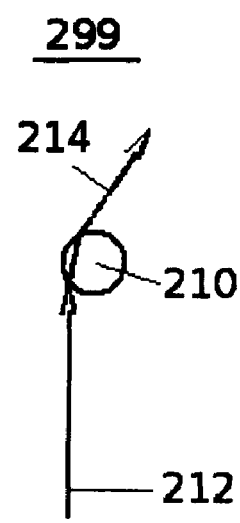
FIG. 2B illustrates a block diagram of an exemplary light deflecting particle, according to one embodiment.

FIG. 2B illustrates a block diagram 299 of an exemplary light deflecting particle 210, according to one embodiment. Light deflecting particle 210 refracts incoming light 212 into outgoing light 214. A light deflecting particle 210 which refracts light may be made of a transparent material with refractive index higher or lower than the refractive index of the core 104. For certain angles and positions of incident light, a refracting particle may cause light to undergo partial or total reflection, thus deflecting its path. Similarly diffraction due to a particle can also cause light deflection. The reflection due to a light deflecting particle need not be specular.

Figure 2C:
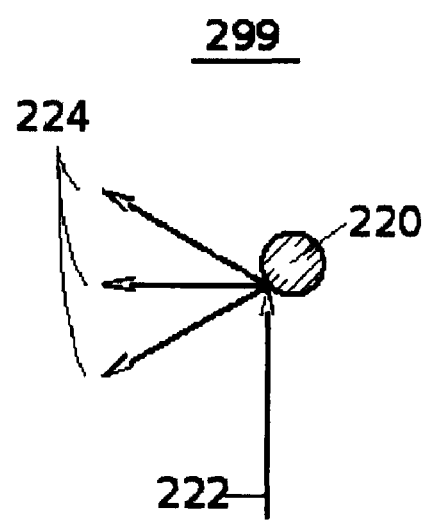
FIG. 2C depicts a light deflecting particle which reflects incoming light into a set of directions causing diffuse reflection, according to an embodiment.

FIG. 2C depicts a light deflecting particle 220 which reflects incoming light 222 into a set of directions 224 causing diffuse reflection, according to an embodiment. Diffuse reflection may occur by using a light deflecting particle of a reflecting material, that has a surface that is not smooth, but has various undulations. Similarly diffuse refraction may occur by using a refracting particle whose refracting surface is not smooth but has various undulations.

Figure 3A:
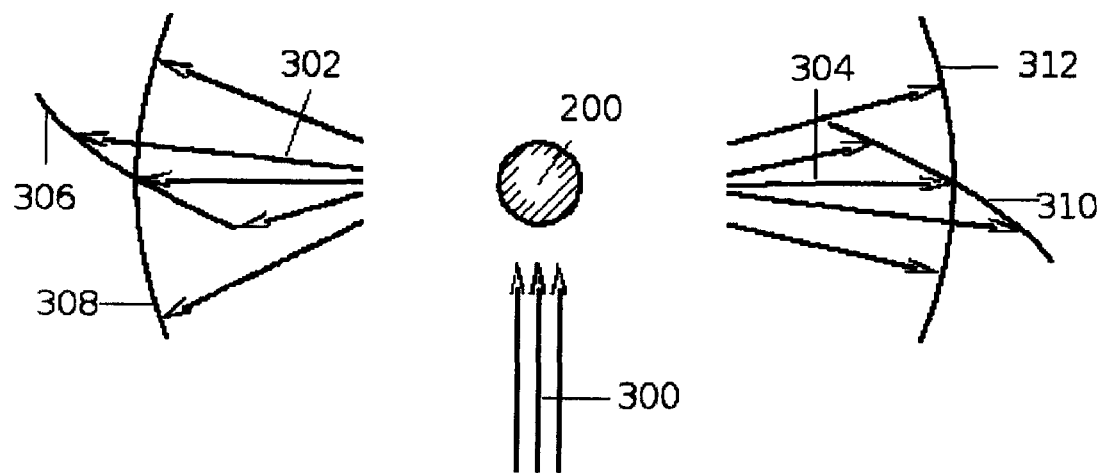
FIG. 3A illustrates a diagram for measuring a the distribution of light emanating from a light deflecting particle, with respect to the direction of emanation, according to one embodiment.

FIG. 3A illustrates a diagram 399 for measuring a the distribution of light emanating from a light deflecting particle, with respect to the direction of emanation, according to one embodiment. A spherical coordinate system with light deflecting particle 200 at the origin is described around the light deflecting particle 200. Curvilinear lines 306 and 310 are sections of the equator of the spherical coordinate system, and curvilinear lines 308 and 312 are parts of a longitudinal great circle, i.e. a great circle going through the poles of the spherical coordinate system. Furthermore, the curvilinear line 308 corresponds to an azimuthal angle of 0 degrees, and the curvilinear line 312 corresponds to an azimuthal angle of 180 degrees. If the light deflecting particle 200 is embedded in a light emanating surface, as explained in conjunction with FIG. 1B, the great circle (formed by curvilinear lines 308 and 312) and the equator (described by lines 306 and 310) are preferably oriented perpendicular to the light emanating surface. In other words, the line joining the center of the particle 200 to the zero azimuthal angle point on the equator (intersection of lines 306 and 308) shall be perpendicular to the surface of emanation.

With the coordinate system setup described above, the distribution of light emanation is now measured as follows. Light 300 of a known intensity shines on the light deflecting particle 200. The intensity of light emanating towards each direction outward from the particle 200 is measured, and recorded against the spherical coordinates, the spherical coordinates being measured as described above. Such measurement may be performed using light measuring equipment such as a photometer. In one embodiment, shining light on a light deflecting particle and measuring the light emanating in various directions is not done physically, but simulated mathematically, possibly inside a computer. Numerical simulations of the Maxwell's equations, or randomized algorithms such as Monte Carlo ray tracing.

Figure 3B:
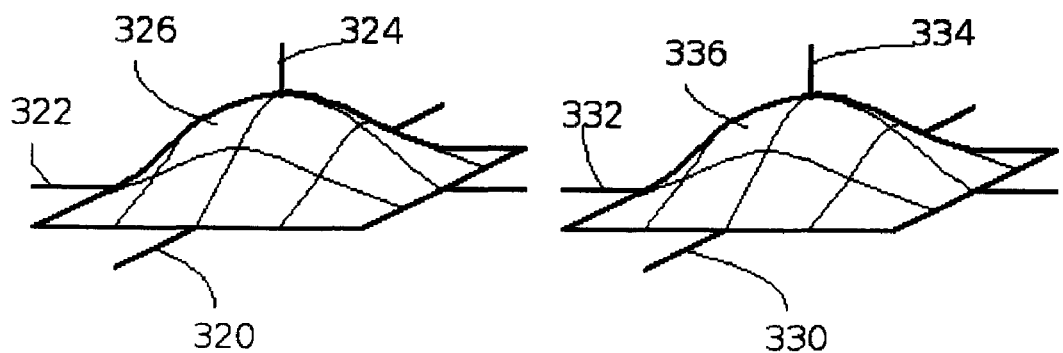
FIG. 3B illustrates an exemplary light intensity graph, according to one embodiment.

FIG. 3B illustrates an exemplary light intensity graph 398, according to one embodiment. Graph 398 is a succinct visualization of the intensity of light emanating towards each direction, as recorded against the spherical coordinates with respect to the particle 200. The graph 326 depicts the intensity of light emanating to the left of the light deflecting particle 200, and the graph 326 depicting the intensity of light emanating to the right of the light deflecting particle 200. In other words, graph 326 is for azimuthal angles between −90 to +90 degrees, and the graph 336 is for azimuthal angles between +90 to +270 degrees, thus completing a full circle. Such separation of the data into two ranges is done only for the purpose of meaningful visualization, it not being mathematical necessity. The two axes 320 and 322 are axes representing the polar angle (or equivalently, elevation) and azimuthal angle respectively. The dependent axis 324 represents the intensity of light emanated. The surface 326 of the graph represents the intensity of light emanated in the various directions. The surface 336 is constructed similarly, wherein the two axes 330 and 332 are axes representing the polar angle (or equivalently, elevation) and azimuthal angle respectively and the dependent axis 334 represents the intensity of light emanated.

Graph 398 shows a general emanation pattern caused by a general light emanating particle 200. Graphs similar to graph 398 visually depict the emanation patterns of various systems. The emanation patterns depicted may be applicable to a group of light deflecting particles rather than a single light deflecting particle. In such cases the spherical coordinate system is inscribed around the center of such a group of particles. Graphs similar to graph 398 and the data depicted in these are henceforth referred to as an "emanation pattern".

Figure 4A:
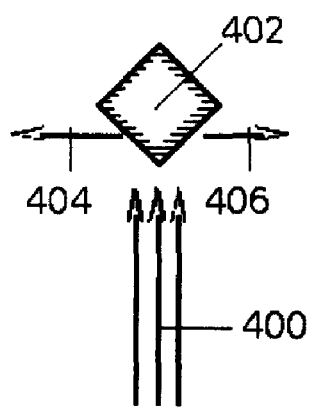
FIG. 4A illustrates a diagram of light deflection caused by a light deflecting particle of a cubic shape, according to one embodiment.

FIG. 4A illustrates a diagram of light deflection caused by a light deflecting particle 499 of a cubic shape, according to one embodiment. Light 400 is deflected by a light deflecting particle 402 of a cubic shape. The light is primarily deflected in the direction depicted by emanating light ray 404 and the opposite direction 406. Thus the light is primarily emanated in equatorial directions at an azimuthal angle of 0 and 180 degrees.

Figure 4B:
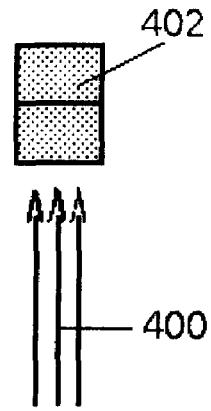
FIG. 4B illustrates a diagram of light deflection particle, viewed from the direction of emanating light, according to one embodiment.

FIG. 4B illustrates a diagram of light deflection particle 499, viewed from the direction of emanating light, according to one embodiment. It is viewed from the direction of emanating light 404, i.e. viewed from an azimuthal angle of 0 degrees.

In an embodiment, the light deflecting particle 402 is embedded in a transparent surface in an orientation such that direction of light emanation 404 is perpendicular to the surface. In this embodiment, the transparent surface acts as a light guide emanating light primarily in a direction perpendicular to the transparent surface.

Figure 4C:
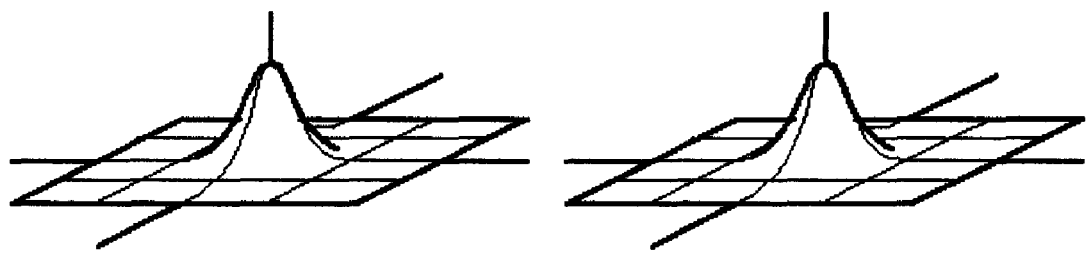
FIG. 4C illustrates a diagram of an exemplary light emanation pattern, according to one embodiment.

FIG. 4C illustrates a diagram of an exemplary light emanation pattern 498 of particle 402, according to one embodiment.

FIG. 5A illustrates a diagram of light deflection caused by a light deflecting particle 599 of a right angled isosceles triangular prismatic shape, according to one embodiment. Light 500 is deflected by light deflecting particle 502, of a right angled isosceles triangular prismatic shape. Reflected light is deflected primarily in the direction depicted by deflected light ray 504.

FIG. 5B illustrates a diagram of light deflection 599, viewed from the direction of emanating light, according to one embodiment.

FIG. 5C illustrates an exemplary emanation pattern 598 pertaining to a light deflecting particle 502, according to one embodiment.

Not only the shape but the size of the particle also affects its emanation pattern. (This is especially true for microscopic particles, having sizes lower than 100 microns.)

FIG. 5D illustrates a diagram of an exemplary emanation pattern 599, according to one embodiment of the present invention. A light ray 512 falling on a primarily smooth surface of a light deflecting particle particle 510 gets specularly reflected in a single direction. A light ray 514 falling at or near a corner of light deflecting particle 510 gets dispersed in many directions due to diffraction. How near the ray has to be to the corner for the diffraction effect to be seen depends on the wavelength of light, and is dependent on the size of the particle 510. Thus, the smaller the particle 510, the larger the fraction of light that will be diffracted in this way.

It is thus seen that various shapes and sizes of light deflecting particles cause various emanation patterns. As described above, the emanation pattern caused by a light deflecting particle of a particular shape and size may be evaluated by physical experiment or by evaluating the emanation pattern using optical principles or by evaluating the same with the help of simulation of optical activity inside a computer.

A multitude of particles of a particular shape and size may be produced. Furthermore, particles not necessarily of a single shape and size, but of a multitude of shapes and sizes are also useful, thus forming a probability distribution over the shapes and sizes produced.

In one embodiment, particles having a particular crystal shape may be produced by crystallization. Many materials have a natural tendency to form cubic crystals. Controlled crystallization of such materials produce cube shaped particles, of a particular size, or with a known probability distribution of sizes. Similarly, particles of any known crystal shape may be produced.

In another embodiment, aspherical particles are produced using liquid atomization, gas atomization, grinding or filing. Though the particle shape and size may not be precisely controlled with such methods, a known distribution of shapes and sizes is produced.

In another embodiment, particles of required (preferably aspherical) shape and size are produced using casting. A multitude of particles may be produced using a single die.

In another embodiment, a method of producing particles, similar to the casting method is used.

Figure 6A:
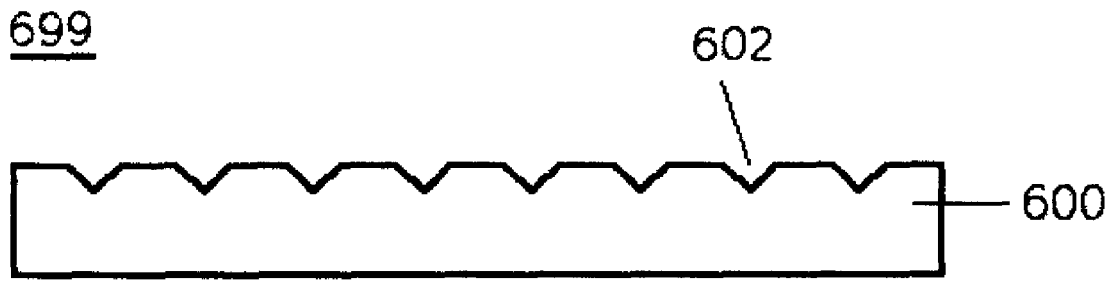
FIG. 6A illustrates a block diagram of a mold having many depressions, according to one embodiment.

FIG. 6A illustrates a block diagram of a mold 699 having many depressions 602, according to one embodiment. Mold 600 is made having many depressions such as 602 in at least one of its surfaces. The mold 600 may be cast with the surface depressions 602. Alternatively, depressions 602 may be formed on a sheet of the material of the mold 600 by machining methods such hammering or drilling or other similar industrial methods.

Figure 6B:
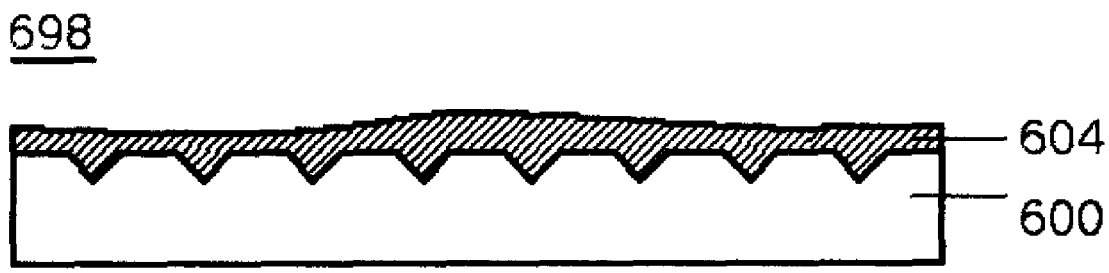
FIG. 6B illustrates a block diagram of coating a material to create particles, according to an embodiment.

FIG. 6B illustrates a block diagram 698 of coating 604 a material to create particles, according to an embodiment. A coating 604 of the material of which the particles are to be made is given to the surface of the mold 600. This coating 604 may be applied by various methods including casting, chemical deposition, electrochemical deposition, chemical vapor deposition, physical vapor deposition, sputtering, spin coating and other film deposition and formation, coating and plating methods. The coating 604 enters depressions such as 602 in mold 600.

Figure 6C:
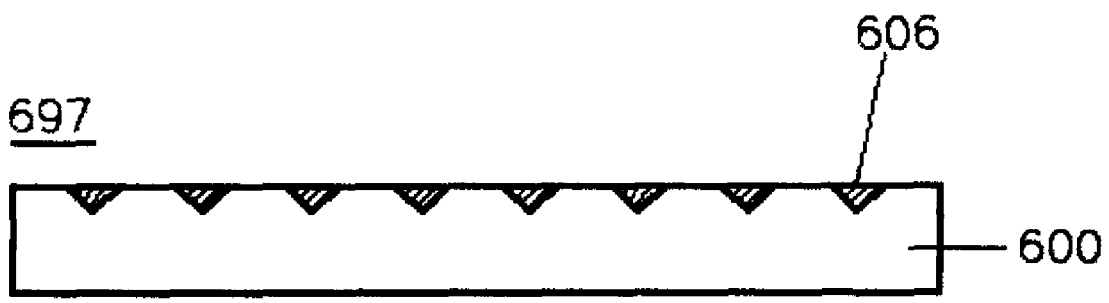
FIG. 6C illustrates a block diagram of removing excess coating from the coated surface, according to one embodiment.

FIG. 6C illustrates a block diagram 697 of removing excess coating from the coated surface, according to one embodiment. Excess coating may be removed using methods such as polishing including chemical-mechanical polishing. The polishing exposes the original surface of the mold 600, and a small part of the surface of the mold 600 may also get polished away in the process. This leaves small particles such as 606 embedded in the surface of the mold 600. These small particles are removed from the mold 600. The removal may be performed by mechanically bending the cast 600, or by dissolving the cast 600 using a solvent or chemical such that only the particles are left behind. Thus, a multitude of particles of a particular shape are formed.

Figure 6D:
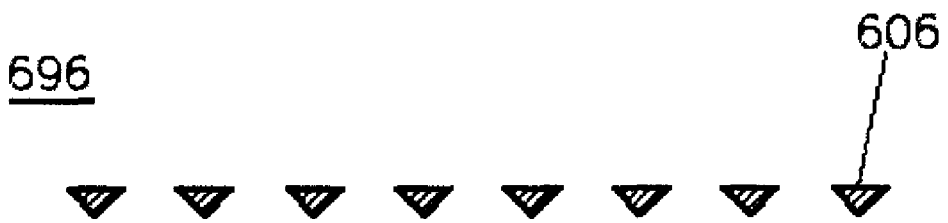
FIG. 6D illustrates a block diagram of a multitude of particles of a particular shape, according to one embodiment.

FIG. 6D illustrates a block diagram of a multitude of particles 696 of a particular shape, according to one embodiment. The particles can be produced in any required shape by changing the shape of the depressions in the cast. In another embodiment, particles of particular shapes are produced by coating of seed particles.

FIG. 7A illustrates a block diagram of an exemplary coated particle 799, according to an embodiment. A seed particle 700 of a particular shape and size, is covered with a coat 702 of the same or another material. The coat 702 augments the shape of the seed particle 700. In particular, the corners and edges of the original particle now become more rounded in shape, thus causing more light to be reflected in different directions rather than a single direction, and thus increasing diffuse versus directional light deflection.

FIG. 7B illustrates a block diagram of an exemplary coated particle 798, according to an embodiment. The seed particle 700 is coated with a coat 704 which is thicker than the coat 702. Changing the thickness of the applied coat changes not only the size but also the shape of the composite particle. The larger the coat, the rounder the eventual particle will be. While designing the methodology to produce the particle, the effect due to the thickness of the coat is subtracted from the final size of the particle to arrive at the particle size of the seed particle 700. Similar to coating, polishing, (i.e. removal of material from the surface of the particle) may be used to modify the shape of the particle. Polishing methodologies include chemical polishing, chemical-mechanical polishing, electropolishing and mechanical polishing.

In another embodiment, annealing is used to modify the shape of particles after initial production by casting, deposition or other methods. In the case that the original particle before annealing is formed conforming to the crystal geometry of the material, such crystal geometry is enhanced after annealing. For example, suppose the original particle material tends to form cubic crystals, a highly cubic particle may be formed by first casting it in a shape close to a cubic shape, and then annealing the particle to form a perfect cubic crystal.

The emanation pattern of a light deflecting particle depends not only on the shape and size of the particle but also on properties of the surface of the particle among many other parameters.

The bidirectional reflectance distribution function (BRDF) is one such property of surfaces. BRDF is a function which relates the amount of light being reflected in a particular direction relative to a small surface element to the amount of light that reaches the element from a particular direction. The BRDF is a function of angle of incidence of light, angle of reflection of light, wavelength of light and the position of the surface element.

The BRDF of a particle has an effect on its light emanation pattern. Thus the distribution of extracted light from a light guide depends on the BRDF of particles present in the light guide.

In one embodiment, the BRDF of particles is changed by coating them with a suitable pigment or with a mixture of pigments in various proportions.

In another embodiment, BRDF is changed by performing chemical reactions on the particle. The chemical reactions may be treatment by acids, oxidation or other reactions that affect the surface of the particle.

In another embodiment, the BRDF of the light extracting particle is changed by using known microscopic surface engineering techniques like micro-abrasion and micro-deformation. Microabrasion may be done mechanically through scraping, rubbing, sanding, filing or chipping. Microabrasion may also be done by treating surfaces with chemicals. Micro deformation may be done by denting or mechanically through scraping, rubbing or sanding. Micro deformation may also be done by crystallization methods. In one method, an aspherical particle is used as a seed particle on which crystals of a particular kind are grown. The crystal growth is controlled in such a way that the crystal surface possesses the required deformations.

Figure 8:
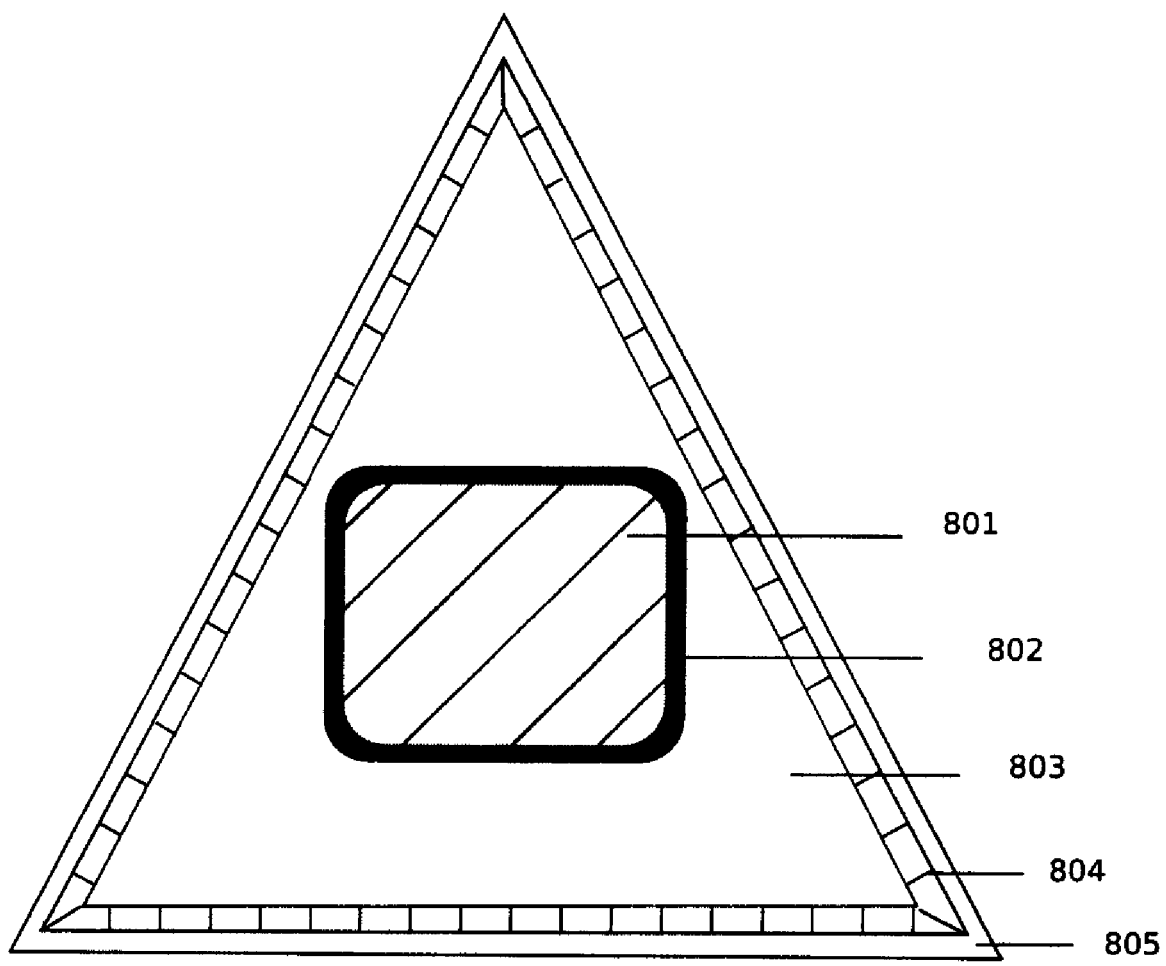
FIG. 8 illustrates an exemplary particle produced by layering several materials, according to one embodiment.

FIG. 8 illustrates an exemplary particle 899 produced by layering several materials, according to one embodiment. Each layer imparts a specific property to the particle 899. Various layers are used to impart shape, size, BRDF, orientability and other properties. Various other embodiments comprise various subsets of the layers disclosed in the present embodiment. The layers may be disposed in other orders than the one disclosed.

Layer 801 is a layer imparting a property by which the particle may be oriented in a particular direction by use of a force field.

Layer 802 is a layer which stores charge on it or contains free charge. Thus, this layer may impart a particular charge to the particle. Layer 802 may be a metal or any material which retains charge on its surface. The layer 802 may be charged by any charge transfer process, such as friction. When all particles have like charge, they repel each other. This avoids clumping of particles as they are introduced in a liquid.

Layer 803 is an exemplary layer which imparts shape to the particle. Layer 803 may be produced by crystal growth around the previous layer. Layer 803 may also be used to achieve a required particle size by controlling the layer thickness.

Layer 804 is a layer which changes the BRDF property of the particle surface. Layer 804 may be a suitable pigment or a mixture of pigments in various proportions. The layer 804 may be a coating of a particular material, possibly with its surface treated physically or chemically to alter its BRDF. The layer 804 may comprise a reflecting, wavelength selective or transparent material. The layer 804 may be a composite or layered composite of such materials.

Layer 805 is a layer which creates affinity of the particle towards a base material in which the particle is to be dispersed. Layer 805 is a suitably chosen material which has affinity to a particular liquid. Affinity towards a suitable liquid avoids clumping of particles as they are introduced in that liquid.

Any of the layers may be produced over another layer by crystal growth around the previous layer, as well as by coating methods such as casting, chemical deposition, electrochemical deposition, chemical vapor deposition, physical vapor deposition, sputtering, spin coating and other film deposition and formation, coating and plating methods.

It is possible, in some embodiments, for a single material or a single layer to impart more than one useful property to the particle. In such a case one layer is used to impart all these properties. For example, a single metallic layer may impart the required shape, BRDF and orientability properties.

Particle Alignment

The light emanation pattern pertaining to a particle depends on its size, shape and orientation among many other parameters. For obtaining a particular light emanation pattern, aspherical particles are designed which when collectively oriented in a particular manner impart a required light emanation pattern to the light guide.

For achieving a certain light emanation pattern from the light guide, it may be required that particles be oriented such that particle orientation is some function of its position in the light guide. The function that relates a particle's position in the light guide to its orientation is henceforth referred to as orientation distribution profile of the particles with respect to the light guide.

Various methods of aligning particles according to a specific orientation distribution profile are discussed below.

FIG. 9 illustrates a flow diagram of an exemplary process 900 for orienting aspherical particles in a light guide, according to an embodiment of the present invention. Aspherical particles with a particular orientation property are inserted into a liquid base material of a light guide (910). An orientation property of an aspherical particle is a property by which particle orientation occurs when subjected to an orienting force field. The liquid base material is solidified in the presence of an orienting force field (920). In an embodiment, the solid produced becomes the final product. In an alternate embodiment, a section of the produced solid may be cut out to obtain the final light guide with particles oriented in a required direction (930).

Figure 10A:
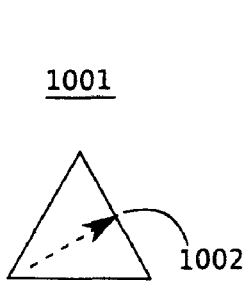
FIG. 10A illustrates an exemplary aspherical particle which has a preferred direction in which it is magnetized, according to one embodiment.

FIG. 10A illustrates an exemplary aspherical particle 1001 which has a preferred direction 1002 in which it can be easily magnetized, according to an embodiment of the present invention. An aspherical particle orients itself in a magnetic field to align the direction of high magnetizability 1002 to the direction of the magnetic field. The possession of a direction of high magnetizability is thus a magnetic orientation property.

Many crystals posses a direction of high magnetizability, and such crystals may be used in the present embodiment. A crystal grown, sintered or annealed in the presence of a magnetic field grows to orient its direction of high magnetizability to the direction of the applied magnetic field. This property is used to produce crystalline or polycrystalline material having a net direction of high magnetizability. One such group of polycrystalline materials is that of composites such as magnetizable ceramics.

A composite material particle is a solid consisting of two or more different materials that are bonded together. Bonding may be done by mechanical or metallurgical processes such as sintering. One component in the composite may be a ferromagnetic material such as iron, cobalt, nickel or gadolinium which are subjected to a magnetic field while the composite is being compacted. The domains of such ferromagnetic material orient their direction of high magnetizability to the direction of the applied magnetic field while the composite is being formed. The collective orientation of component domains results in a composite material particle having a direction of high magnetizability.

Figure 10B:
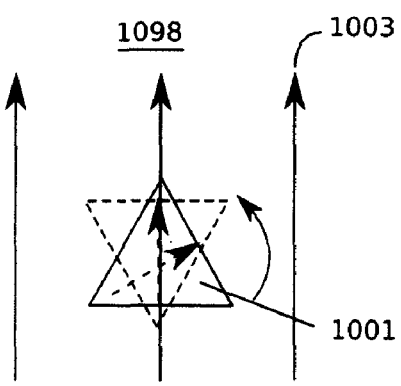
FIG. 10B shows a block diagram of an exemplary particle placed under the influence of a magnetic field, according to one embodiment.

FIG. 10B shows a block diagram of an exemplary particle 1098 placed under the influence of a magnetic field 1003, according to one embodiment. Aspherical particle 1001 has an orientation property that it has a preferred direction of high magnetizability 1002. Under the influence of the magnetic field 1003, the particle 1001 gets magnetized along its preferred direction of high magnetizability 1002. Magnetized particle 1001 experiences a force to align its direction of magnetization with the direction of the applied magnetic field 1003. Thus the particle rotates around itself and gets oriented along the direction of the applied magnetic field 1003. Particle 1001 therefore has a preferred direction of high magnetizability which orients the particle in an orienting magnetic field.

Figure 10C:
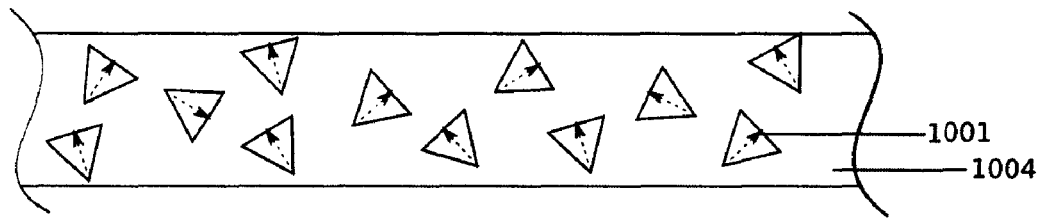
FIG. 10C shows a block diagram of an exemplary liquefied light guide sheet with aspherical particles, according to one embodiment.

FIG. 10C shows a block diagram of an exemplary liquefied light guide sheet 1097 with aspherical particles, according to one embodiment. Several aspherical particles, such as particle 1001, having a preferred direction of high magnetizability, such as direction 1002 pertaining to particle 1001, are inserted into a base material 1004 of a light guide sheet.

Figure 10D:
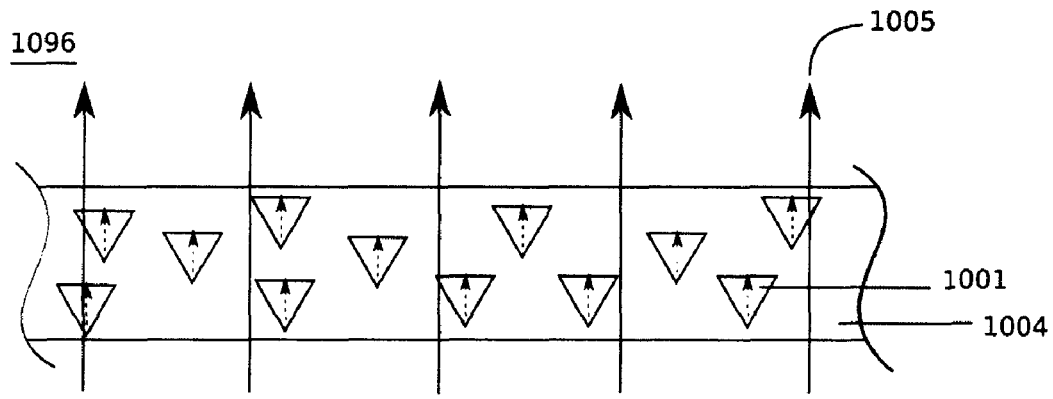
FIG. 10D shows a block diagram of an exemplary solidified light guide sheet, according to one embodiment.

FIG. 10D shows a block diagram of an exemplary solidified light guide sheet 1096, according to one embodiment. The base material 1004 is solidified under the influence of a magnetic field 1005. In an embodiment, field lines of magnetic field 1005 are parallel. Magnetic field 1005 causes forces to act on aspherical particles, such as particle 1001, as discussed in conjunction with FIG. 10B. These forces orient the asphercial particles in a required direction.

Figure 10E:
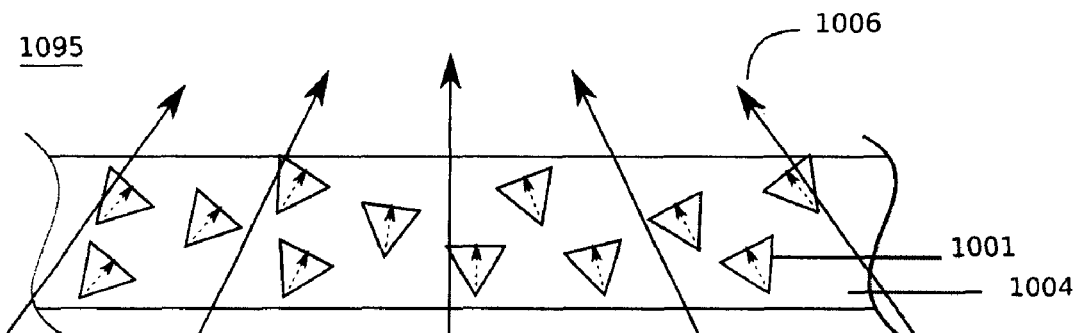
FIG. 10E shows a block diagram of an exemplary solidified and magnetized light guide sheet, according to one embodiment.

FIG. 10E shows a block diagram of an exemplary solidified and magnetized light guide sheet 1095, according to one embodiment. The base material 1004 is solidified under the influence of a magnetic field 1006. Magnetic field 1006 is varied in intensity and direction throughout the base material 1004. Such a magnetic field orients the aspherical particles according to a particular orientation distribution profile. By controlling the magnetic field intensity and direction throughout the light guide, the orientation distribution profile of the aspherical particles can be controlled.

Figure 11A:
FIG. 11A illustrates a block diagram of an exemplary aspherical particles, according to one embodiment.

FIG. 11A illustrates a block diagram of an exemplary aspherical particles 1199, according to one embodiment. Aspherical particles, such as particle 1101, are made to fall on a flat surface 1104 from some height. While falling, the aspherical particles' denser portion bonds first due to gravity. In one embodiment, a thin, single particle layer accumulates on the flat surface. Thus, a layer of aspherical particles is obtained such that all aspherical particles are oriented in the same direction.

Figure 11B:
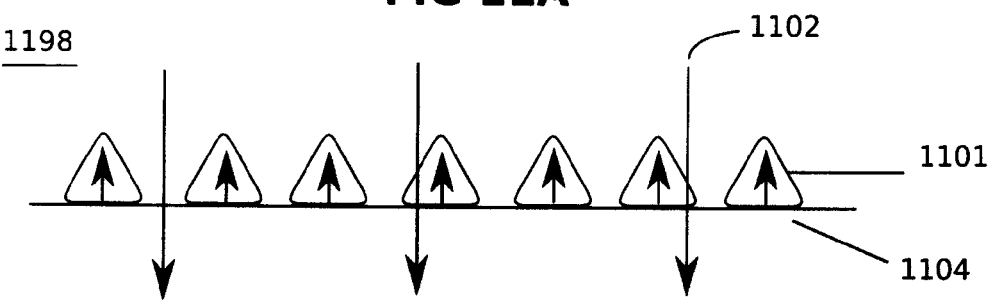
FIG. 11B illustrates a block diagram of magnetized aspherical particles, according to one embodiment.

FIG. 11B illustrates a block diagram of magnetized aspherical particles 1198, according to one embodiment. The aspherical particles, such as particle 1101, on the flat surface 1104 are oriented in the same direction. These aspherical particles are subjected to a magnetic field 1102. All the particles get magnetized in the same direction due to magnetic field 1102. This magnetization of a particle causes the particle to get oriented by application of a magnetic field, and hence it is a magnetic orientation property. Such magnetization of a particle to create a magnetic orientation property is henceforth referred to as premagnetization.

In another embodiment, in an exemplary apparatus, premagnetization of all aspherical particles in a particular direction is done as follows. Aspherical particles are grown as crystals and a magnetic field is applied during the crystal growth. The formed crystals are premagnetized in a particular direction.

In yet another embodiment, in an exemplary apparatus, the similarly oriented aspherical particles, such as particle 1105 are premagnetized by heating aspherical particles beyond the Curie temperature, applying a magnetic field and then cooling below the Curie temperature.

Figure 11C:
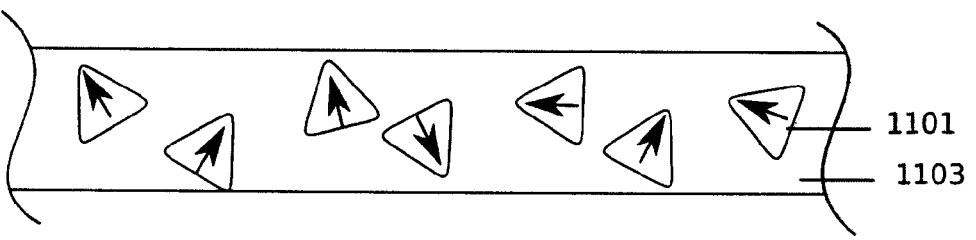
FIG. 11C illustrates a block diagram of premagnetized aspherical particles inserted into a base material of a light guide, according to one embodiment.

FIG. 11C illustrates a block diagram of premagnetized aspherical particles 1197 inserted into a base material 1103 of a light guide, according to one embodiment. Aspherical particles, such as particle 1101, may get randomly oriented throughout the base material.

Figure 11D:
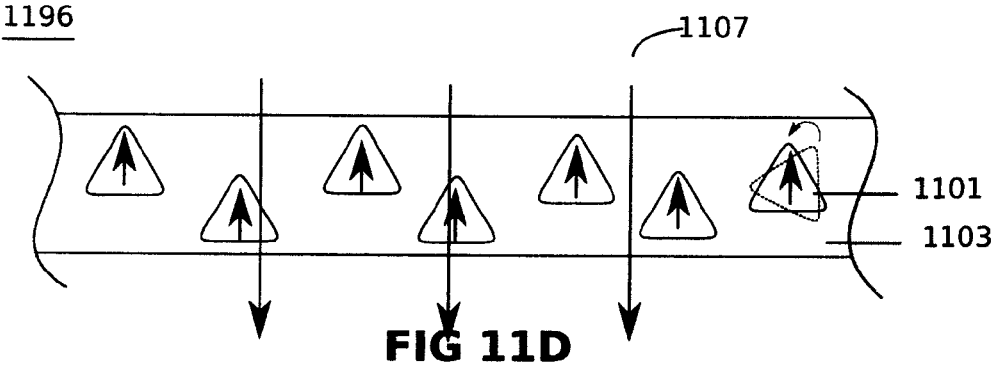
FIG. 11D illustrates a block diagram of a solidified base material with magnetized particles, according to one embodiment.

FIG. 11D illustrates a block diagram 1196 of a solidified base material 1103 with magnetized particles, according to one embodiment. The base material 1103 is solidified under the influence of a uniform magnetic field 1107. In an embodiment, magnetic field lines do not diverge so that the particles do not get pushed to one side of the light guide. The interaction of magnetic fields causes a force to act on each aspherical particle, such as particle 1101. This force orients all particles along the direction of the magnetic field. The direction of the magnetic field can be controlled to achieve orientation of aspherical particles along a required direction.

Figure 11E:
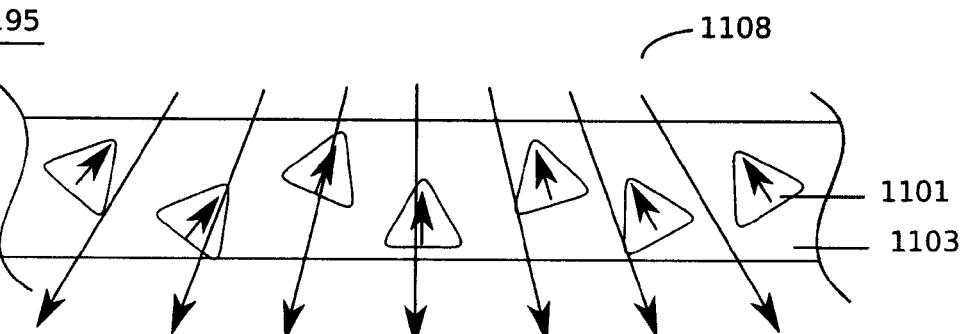
FIG. 11E illustrates a block diagram of a solidified base material with a variable magnetic field, according to one embodiment.

FIG. 11E illustrates a block diagram of a solidified base material 1195 with a variable magnetic field, according to one embodiment. The base material 1103 is solidified under the influence of a magnetic field 1108. Magnetic field 1108 is varied in intensity and direction throughout the base material 1103. Such a magnetic field orients the aspherical particles, such as particle 1101, according to a particular orientation distribution profile. By controlling the magnetic field intensity and direction throughout the light guide, the orientation distribution profile of the aspherical particles can be controlled.

Figure 12A:
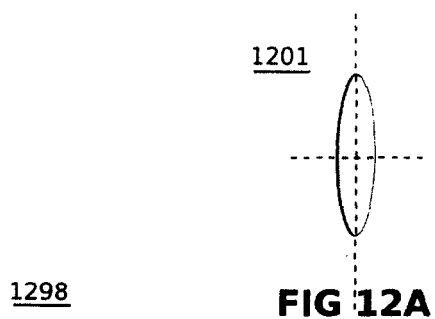
FIG. 12A illustrates an exemplary aspherical particle, according to one embodiment.

FIG. 12A illustrates an exemplary aspherical particle 1201, according to one embodiment. Particle 1201 may be made of ferromagnetic material such as iron, cobalt, nickel or gadolinium. Particle 1201 may also be any non-metallic particle with a ferromagnetic material layer deposited on it. Layer deposition may be done using layer deposition techniques.

Figure 12B:
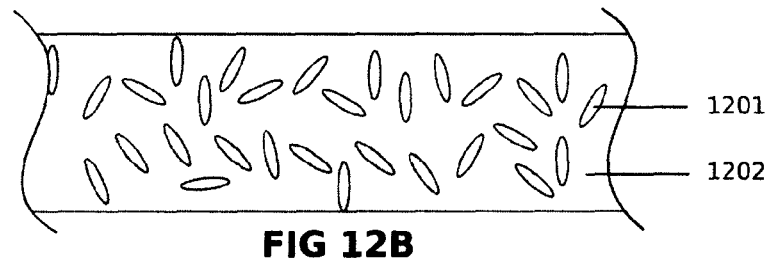
FIG. 12B illustrates a block diagram of an exemplary liquefied light guide with aspherical particles, according to one embodiment.

FIG. 12B illustrates a block diagram of an exemplary liquefied light guide 1298 with aspherical particles, according to one embodiment. A plurality of aspherical particles, such as particle 1201, are inserted in a base material 1202 of light guide.

Figure 12C:
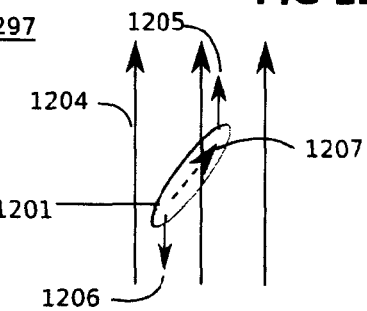
FIG. 12C illustrates a block diagram of an exemplary aspherical particle under a magnetic field, according to one embodiment.

FIG. 12C illustrates a block diagram of an exemplary aspherical particle 1297 under a magnetic field, according to one embodiment. Exemplary particle 1201 in the light guide base material 1202 is subjected to a magnetic field 1204. The applied magnetic field causes magnetic poles to be induced in the particle such that the particle behaves like a magnetic dipole. A magnetic dipole thus placed in the magnetic field 1204 experiences a torque formed by forces 1205 and 1206. The torque rotates the particle such that the dipole axis 1207 is oriented along the direction of the magnetic field. Thus the property of possessing a magnetic dipole character in presence of a magnetic field is a magnetic orientation property of aspherical particles such as particle 1201.

Figure 12D:
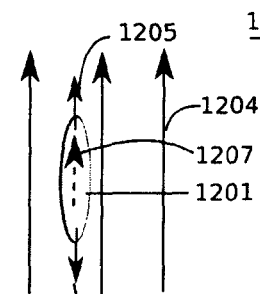
FIG. 12D illustrates a block diagram of an exemplary aspherical particle in equilibrium, according to one embodiment.

FIG. 12D illustrates a block diagram of an exemplary aspherical particle 1296 in equilibrium, according to one embodiment. FIG. 12D illustrates equilibrium position of the particle 1201 subjected to the magnetic field 1204. In this equilibrium position, forces 1205 and 1206 cancel out.

Figure 12E:
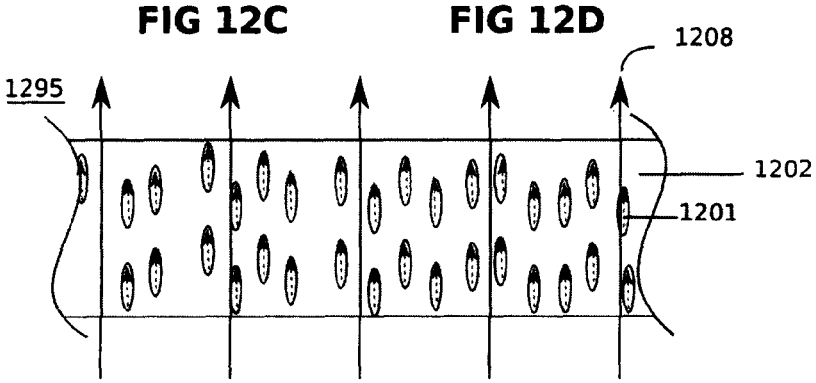
FIG. 12E illustrates a block diagram of an exemplary liquefied light guide in a magnetic field, according to one embodiment.

FIG. 12E illustrates a block diagram of an exemplary liquefied light guide 1295 in a magnetic field, according to one embodiment. The base material 1202 of the light guide is solidified under the influence of a magnetic field 1208. All aspherical particles, such as particle 1201, in the light guide 1202 experience a torque, as explained in conjunction with FIG. 12C. Aspherical particles rotate to orient themselves along the direction of the magnetic field. The base material of the light guide 1202 is gradually solidified so that particles retain their orientation forever.

Figure 12F:
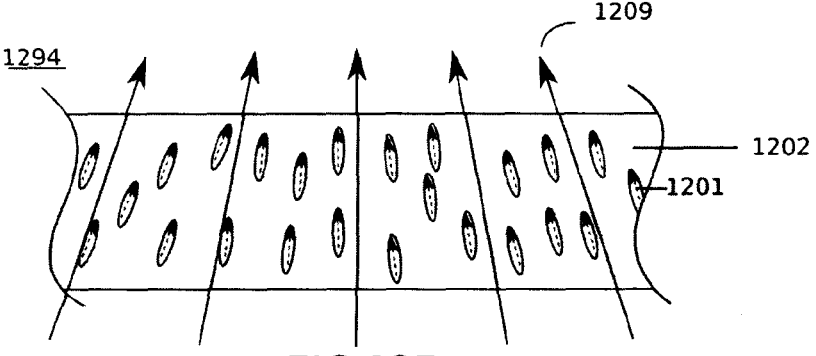
FIG. 12F illustrates a block diagram of an exemplary solidified light guide in a magnetic field, according to one embodiment.

FIG. 12F illustrates a block diagram of an exemplary solidified light guide 1294 in a magnetic field, according to one embodiment. Solidified light guide base material 1202 is subjected to a magnetic field 1209 which is varying in intensity and direction throughout the light guide 1202. The magnetic field may be varied in such a way that aspherical particles, such as particle 1201, get oriented according to a required orientation distribution profile. By controlling the magnetic field intensity and direction throughout the light guide, the orientation distribution profile of the aspherical particles can be controlled.

FIG. 13A illustrates a block diagram of an exemplary aspherical particle 1301 which is to be oriented in a light guide, according to an embodiment of the present invention. Particle 1301 may be a metallic particle with free charge on its surface or a polar dielectric particle.

FIG. 13B illustrates a block diagram of an exemplary liquefied light guide 1398, according to one embodiment. Several aspherical particles, such as particle 1301, are dispersed in a base material 1302 of a light guide.

FIG. 13C illustrates a block diagram of an exemplary aspherical particle 1397 in a magnetic field, according to one embodiment. Aspherical particle 1301 is subjected to an electric field 1304. The applied electric field 1304 causes charges in the particle to separate such that the particle behaves like a dipole. A dipole thus placed in the electric field 1304 experiences a torque formed by forces 1305 and 1306. The torque rotates the particle such that the dipole axis is oriented along the direction of the electric field. Thus the property of acquiring an electric dipole nature in the presence of an electric field is an electrical orientation property pertaining to a particle such as particle 1301.

FIG. 13D illustrates a block diagram of an exemplary aspherical particle 1396 in an equilibrium position, according to one embodiment. FIG. 13D illustrates aspherical particle 1396 in an equilibrium position subjected to electric field 1304. In this position, forces 1305 and 1306 cancel out.

FIG. 13E illustrates a block diagram of an exemplary solidified light guide 1395, according to one embodiment. The base material 1302 is solidified under the influence of an electric field 1307. All aspherical particles, such as particle 1301, experience a torque, as explained in conjunction with FIG. 13C, and rotate to orient themselves along the direction of the electric field. By controlling the angle of the electric field, the orientation of particles can be controlled.

FIG. 13F illustrates a block diagram of an exemplary solidified light guide 1394 subjected to a magnetic field, according one embodiment. Light guide base material 1302 is subjected to an electric field 1309 which has varying intensity and direction throughout the light guide. The electric field may be varied in such a way that particles, such as particle 1301, get oriented according to a required orientation distribution profile. By controlling the electric field intensity and direction throughout the light guide, the orientation distribution profile of the aspherical particles can be controlled.

Figure 14A:
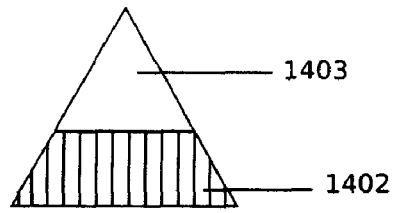
FIG. 14A illustrates a block diagram of an exemplary aspherical particle, according to one embodiment.

FIG. 14A illustrates a block diagram of an exemplary aspherical particle 1401, according to an embodiment of the present invention. Aspherical particle 1401 is denser in region 1402 as compared to region 1403. To produce regions of high density, an aspherical particle may be produced coating a dense particle by a material of lesser density, the coat being of non-uniform thickness. Alternatively, a non-uniform coat of higher density may be applied.

Figure 14B:
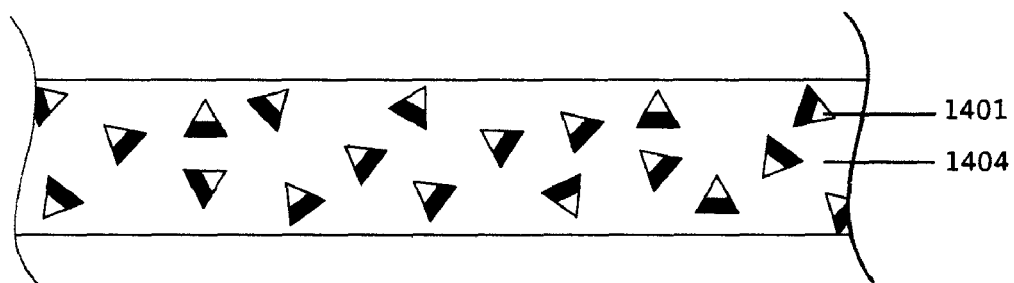
FIG. 14B illustrates a block diagram of an exemplary liquefied light guide, according to one embodiment.

FIG. 14B illustrates a block diagram of an exemplary liquefied light guide 1498, according to one embodiment. Aspherical particles, such as particle 1401, are inserted in a base material 1404 of a light guide.

Figure 14C:
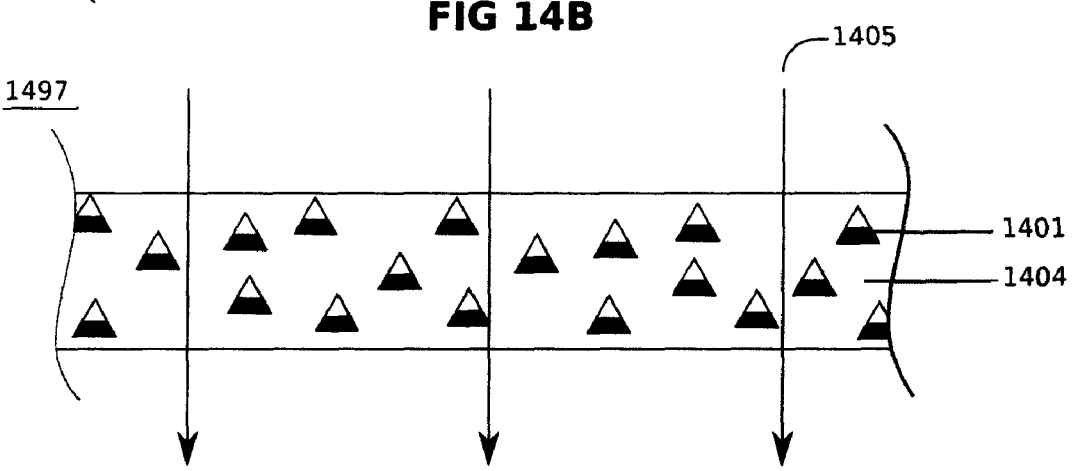
FIG. 14C illustrates a block diagram of an exemplary solidified light guide with magnetic aspherical particles, according to one embodiment.

FIG. 14C illustrates a block diagram of an exemplary solidified light guide 1497 with magnetic aspherical particles, according to one embodiment. Gravity acts on the aspherical particles in the base material 1404 of light guide such that their denser parts, such as part 1402 of particle 1401, experience a larger force than their less dense parts. This causes the particles to orient such that their denser parts sink towards the ground. Aspherical particles, such as particle 1401, have a gravitational orientation property which helps them get oriented in presence of a gravitational field. Thus the particles get oriented in the same direction. Base material 1404 is solidified in the presence of gravity to produce a light guide with aspherical particles permanently oriented in the required direction.

Figure 14D:
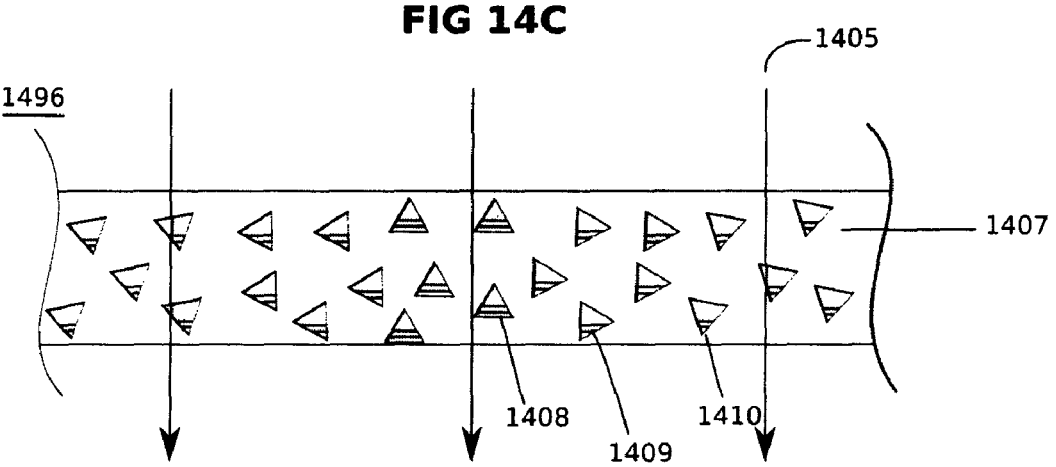
FIG. 14D illustrates a block diagram of an exemplary light guide subject to a magnetic field, according to one embodiment.

FIG. 14D illustrates a block diagram of an exemplary light guide 1496 subject to a magnetic field, according to one embodiment. Aspherical particles inserted in the base material 1407 of a light guide are similar to aspherical particles discussed in conjunction with FIG. 14C, except that aspherical particles in different parts of the light guide have different regions of high density. The aspherical particles in the central region of the base material, such as particle 1408, have a high density flat base region. The aspherical particles around the central region, such as particle 1409, have a high density region which is tilted with respect to the base. The aspherical particles further away, such as particle 1410, have a high density region which is further tilted from the base as compared to that of particles such as particle 1409. In the presence of gravity, aspherical particles 1408, 1409 and 1410 attain different equilibrium positions which are gradually more tilted to the bottom plane of the light guide. Consequently, aspherical particles throughout the light guide orient according to a particular orientation distribution profile. By controlling the dense regions within aspherical particles, a required orientation distribution profile may be obtained.

FIG. 15 illustrates a flow diagram of an exemplary process 1500 for orienting aspherical particles in a light guide, according to an embodiment of the present invention. The base material is initially formed from a solution with a number of aspherical particles suspended in it (1510). The base material is allowed to crystallize so that it forms a crystal lattice structure (1520). During crystal growth, aspherical particles get trapped in the crystal structure in a minimum energy configuration (1530). Since the crystal structure is uniform and repetitive, all aspherical particles get oriented in the same direction. In an embodiment, a solid produced thus is the final product.

Figure 16A:
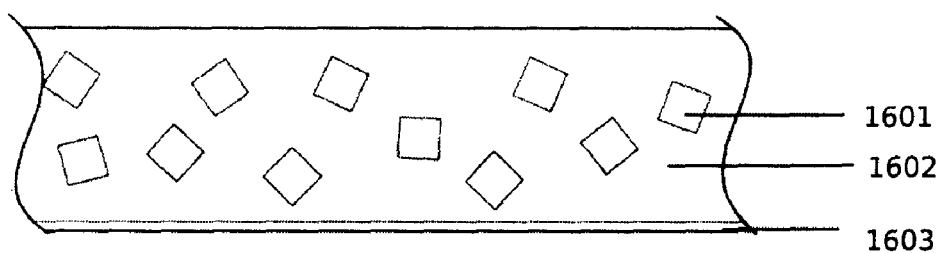
FIG. 16A illustrates a block diagram of an exemplary light guide with cubic aspherical particles, according to one embodiment.

FIG. 16A illustrates a block diagram of an exemplary light guide 1699 with cubic aspherical particles, according to one embodiment. Aspherical particles, such as particle 1601, are inserted into a base material 1602 of a light guide 1699. An exemplary aspherical particle 1601 is a cube. Aspherical particles may be of any shape, such as pyramidal, conical and of any size. Aspherical particles may be made from any material including metals or nonmetals preferably with smooth, plane surfaces. Base material 1602 is a near saturated solution of a crystalline solute. The base material 1602 may be a transparent or a semi transparent liquid with transparent or a semi-transparent solute crystal such as Rochelle salt. The base material solution 1602 is kept in a container 1603. The container 1603 may have a smooth base and edges or may have ridges to facilitate and orient crystal growth. The base material 1602 is allowed to crystallize in a controlled manner.

Figure 16B:
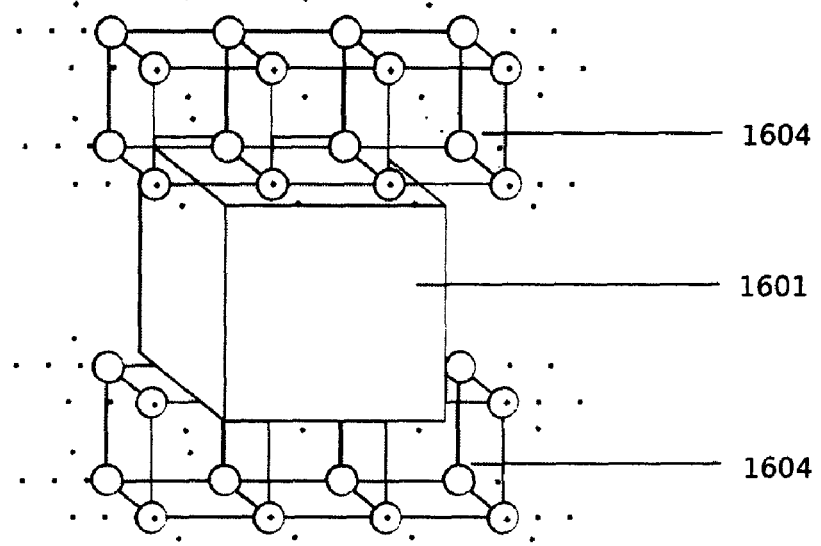
FIG. 16B illustrates a block diagram of an exemplary aspherical particle while crystallizing, according to one embodiment.

FIG. 16B illustrates a block diagram of an exemplary aspherical particle 1698 while crystallizing, according to one embodiment. Aspherical particle 1601 is a cube and hence gets trapped inside a crystal structure in a certain minimum energy configuration. Since the crystal lattice 1604 has a definite repetitive structure throughout the base material 1602, all aspherical particles get oriented in a minimum energy configuration like particle 1601.

Figure 16C:
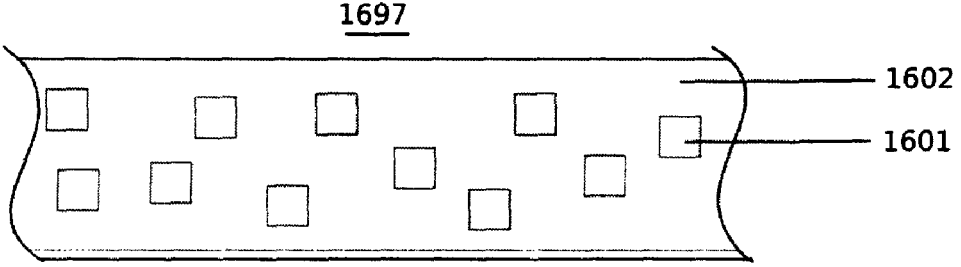
FIG. 16C illustrates a block diagram of an exemplary light guide with crystallized particles, according to one embodiment.

FIG. 16C illustrates a block diagram of an exemplary light guide 1697 with crystallized particles, according to one embodiment. As the base material 1602 is gradually allowed to crystallize, all aspherical particles, such as particle 1601, get trapped in a minimum energy configuration, as explained in conjunction with FIG. 16B. Thus all particles get oriented in a particular direction. The direction of orientation of the aspherical particles may be controlled by the direction of crystal growth. Crystal growth may be controlled by introducing seed particles of known geometry or introducing ridges along particular directions so as to get a particular crystal growth. In an alternate embodiment, crystallization is performed by cooling or by annealing.

FIG. 17A illustrates a flow diagram of an exemplary process 1700 for orienting aspherical particles in a light guide, according to an embodiment of the present invention. A solid light guide with aspherical particles is provided (1710). The light guide is stretched in a particular direction one or many times (1720). Aspherical particles are oriented during the stretching process. In an embodiment, the stretched light guide is used as the final product. In another embodiment, a particular section of the stretched light guide may be cut to obtain a light guide with a required orientation direction of aspherical particles (1730).

Figure 17B:
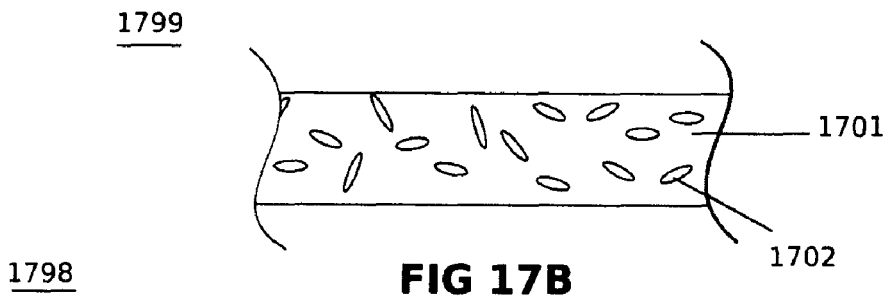
FIG. 17B illustrates a block diagram of an exemplary solid light guide with aspherical particles, according to one embodiment.

FIG. 17B illustrates a block diagram of an exemplary solid light guide 1799 with aspherical particles, according to one embodiment. FIG. 17B illustrates a solid light guide 1701 with aspherical particles.

Figure 17C:
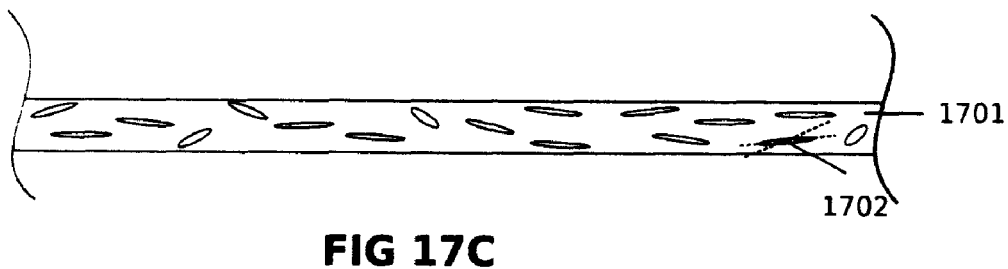
FIG. 17C illustrates a block diagram of an exemplary stretched light guide, according to one embodiment.

FIG. 17C illustrates a block diagram of an exemplary stretched light guide 1798, according to one embodiment. The base material 1701 of light guide 1798 is stretched along one of its edges. The light guide 1798 may be stretched while it has still not completely solidified. Alternatively, light guide 1798 may be stretched after the light guide 1798 has completely solidified. Stretching may be done by pulling the light guide 1798 along its edges. Stretching may also be performed by rolling the light guide 1798 under heavy rollers. The light guide 1798 may be heated before or during the stretching process to make it soft enough for being stretched. During stretching, the aspherical particles, such as particle 1702, tend to orient more to the direction along which the light guide 1798 was stretched. The light guide 1798 is stretched for one or more times such that all particles are almost oriented in the same direction.

Figure 17D:
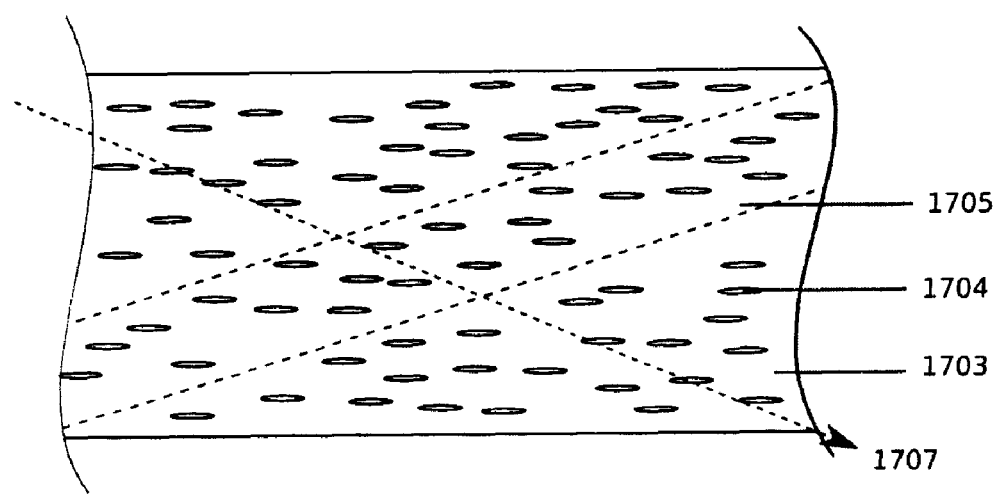
FIG. 17D illustrates a block diagram of an exemplary light guide with aspherical particles oriented in a particular direction, according to one embodiment.

FIG. 17D illustrates a block diagram of an exemplary light guide 1797 with aspherical particles oriented in a particular direction, according to one embodiment. Light guide 1703 contains aspherical particles 1704 oriented along a particular direction. Aspherical particles, such as particle 1704, are oriented in a particular direction using either stretching methodology described in conjunction with FIG. 17C, or using particle orientation processes such as those described above. When the orientation of particles along some other direction, such as direction 1707, is desired, the light guide 1703 is sliced such that the section cut out has aspherical particles in the required orientation. Slice 1705 achieves the correct particle orientation along direction 1707.

Figure 17E:
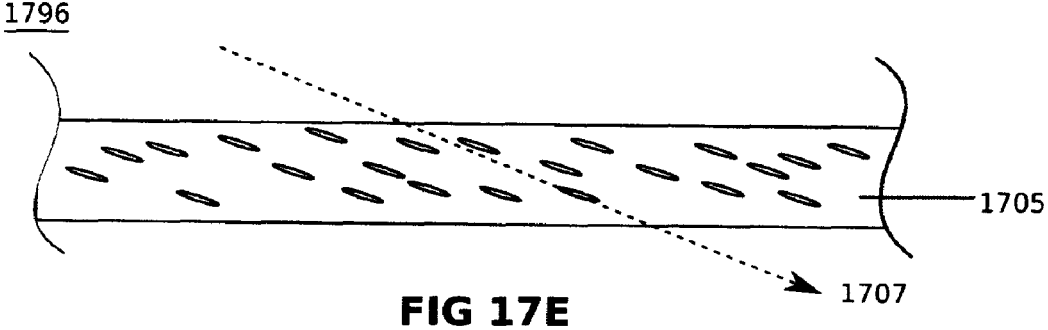
FIG. 17E illustrates an exemplary slice of a light guide, according to one embodiment.

FIG. 17E illustrates an exemplary slice 1705 of a light guide, according to one embodiment. The particles are oriented along direction 1707.

Figure 18A:
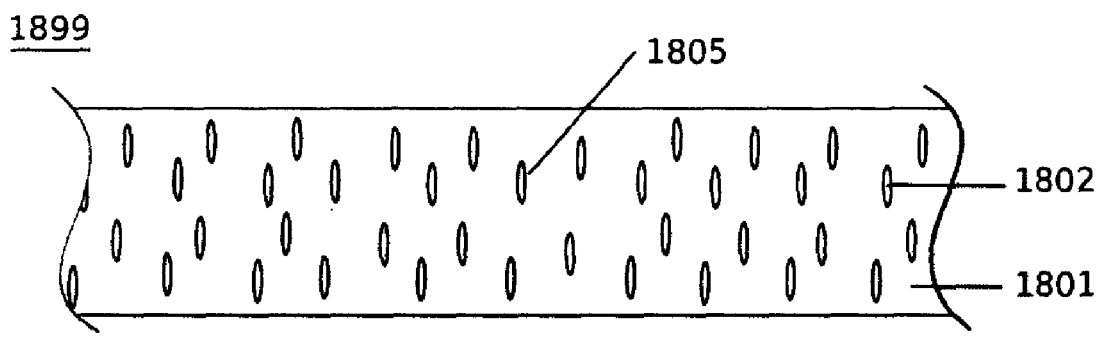
FIG. 18A illustrates a block diagram of an exemplary light guide, according to one embodiment.

FIG. 18A illustrates a block diagram of an exemplary light guide 1899, according to one embodiment. An exemplary light guide 1801 is depicted. Aspherical particles, such as particle 1802, are oriented in a particular direction using one or many particle orientation methods.

Figure 18B:
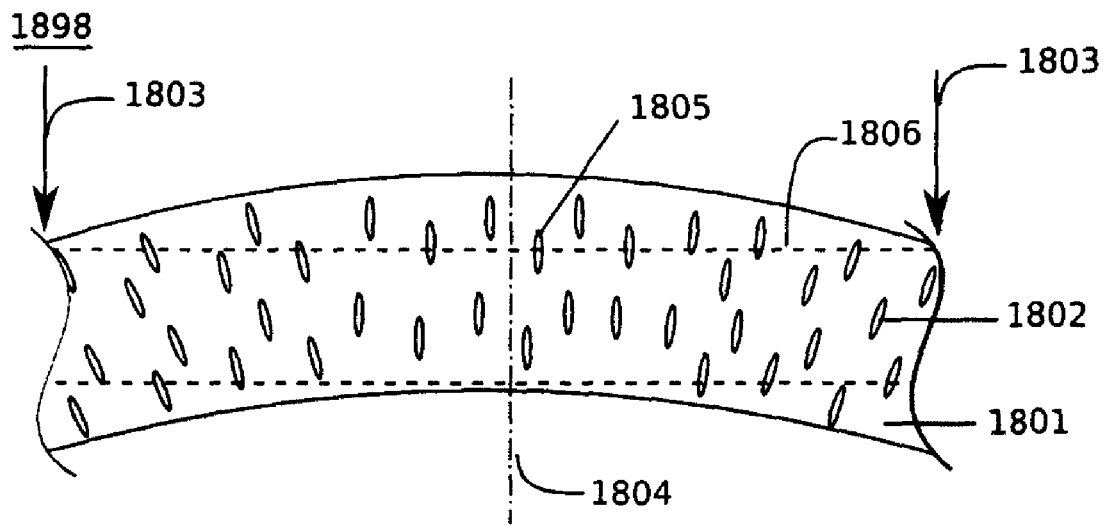
FIG. 18B illustrates a block diagram of an exemplary bent light guide, according to one embodiment.

FIG. 18B illustrates a block diagram of an exemplary bent light guide 1898, according to one embodiment. Light guide 1801 is bent using shear forces 1803 on its edges. Bending of the light guide around an axis may be done by mechanically supporting the light guide around the axial region and putting weights on the light guide edges. Alternatively, weights may be put on the axial region of the light guide and the light guide may be suspended by strings pulling the light guide up by the edges. Due to bending, aspherical particles get oriented along different directions as depicted in the figure. Particle 1805, lying approximately near the middle 1804, does not experience much change in orientation. However, particle 1802, which is a particle far away from the middle 1804, undergoes significant change in orientation. The light guide 1801 is cut along slice 1806.

In another embodiment, the light guide 1801 is bent around multiple axes so as to change orientations of aspherical particles according to a desired orientation distribution profile.

Figure 18C:
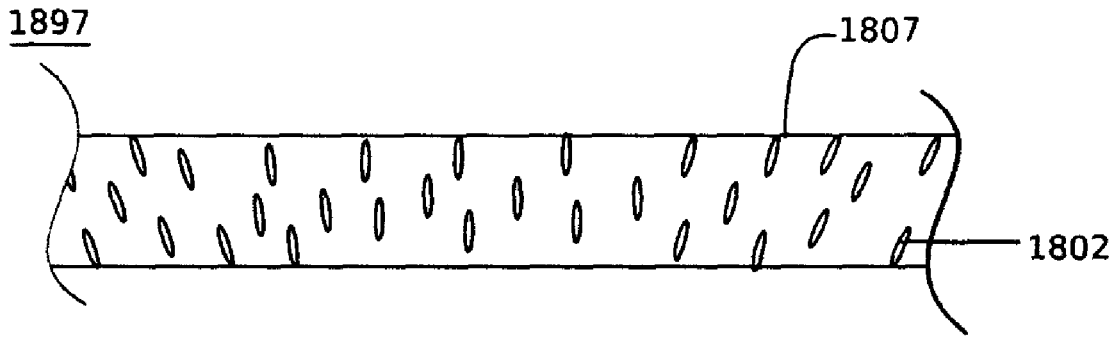
FIG. 18C illustrates a block diagram of an exemplary bent and sliced light guide, according to one embodiment.

FIG. 18C illustrates a block diagram of an exemplary bent and sliced light guide 1897, according to one embodiment. Light guide 1807, is made from light guide 1806 that is bent around an axis and cut along a slice 1806 to form a rectangular slab. This new light guide 1807 has particles oriented according to a specific orientation distribution profile. Different orientation distribution profiles are achieved by controlled bending along different axes and in differing amounts.

In an alternate embodiment, a curved slice of the light guide 1801 is cut out, and then straightened. This produces a specific orientation distribution profile.

Figure 19A:
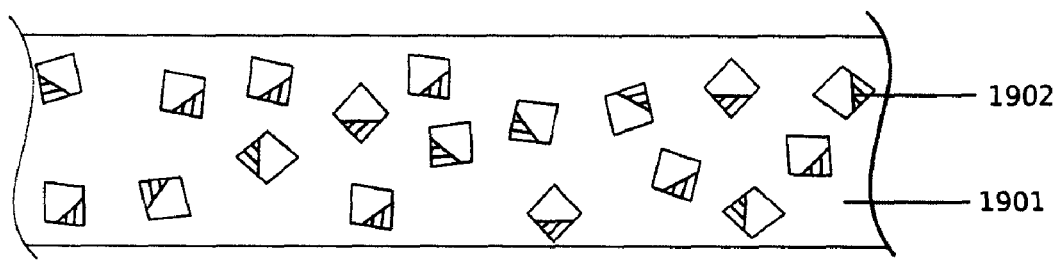
FIG. 19A illustrates a block diagram of an exemplary light guide with thermal particles, according to one embodiment.

FIG. 19A illustrates a block diagram of an exemplary light guide 1999 with thermal particles, according to one embodiment. An exemplary light guide substrate 1901 is depicted. Aspherical light diffusing particles, such as particle 1902, are inserted in the light guide 1901.

Figure 19B:
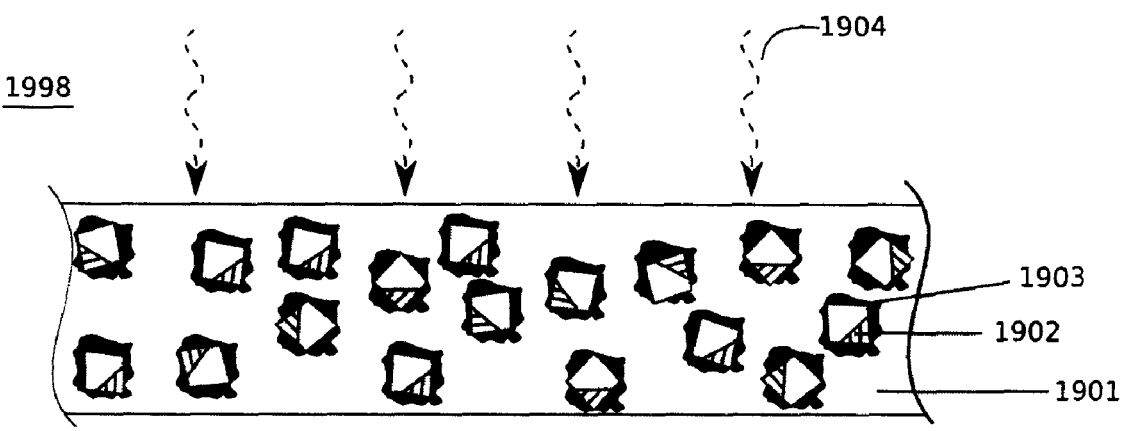
FIG. 19B illustrates a block diagram of an exemplary light guide with heated particles, according to one embodiment.

FIG. 19B illustrates a block diagram of an exemplary light guide 1998 with heated particles, according to one embodiment. Aspherical particles, such as particle 1902, are designed to have an energy absorbing property such that the particles heat up when energy is incident upon them. Such a property may be imparted to the particle by using a layer of material with low specific heat capacity such as copper or tin which heats up when energy is incident upon it. Light guide 1901 is subjected to a controlled energy source, such as a light source. Aspherical particles absorb the incident light energy 1904 and heat up. Heat generation locally melts the light guide material surrounding the aspherical particles. The incident energy and the aspherical particles are designed in such a way that only the light guide material surrounding the aspherical particles melts while the remaining light guide remains solid. This enables local rotational movement of the aspherical particles but does not allow the particles to translate from their position.

In an embodiment, the aspherical particles absorb light of a particular band of frequencies, and light 1904 from the same band of frequencies is used to heat the particles. In the final product, wherein the same particles are used as light dispersers, light of frequencies not absorbed by the particles is used.

Figure 19C:
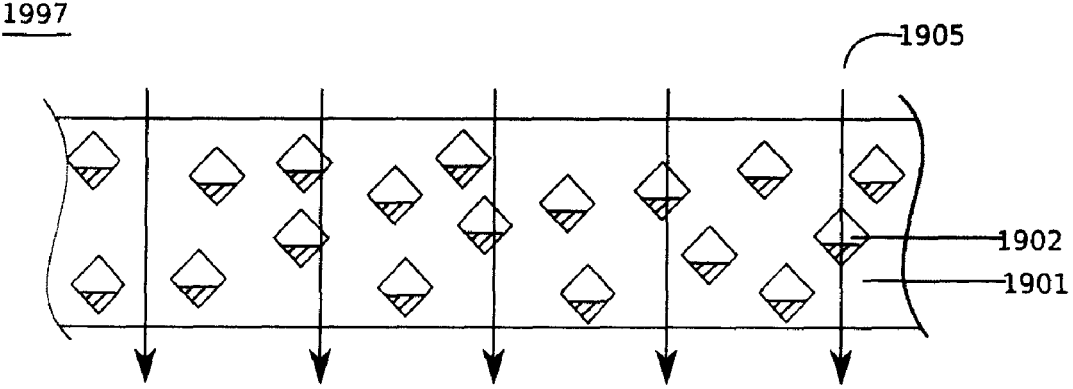
FIG. 19C illustrates a block diagram of an exemplary light guide with magnetically oriented thermal particles, according to one embodiment.

FIG. 19C illustrates a block diagram of an exemplary light guide 1997 with magnetically oriented thermal particles, according to one embodiment. The light guide 1901, with locally liquefied base material 1903 is subjected to an orienting force field 1905 such as a magnetic field, an electric field or gravity to orient aspherical particles, such as particle 1902, with particular orientation properties in a required orientation profile.

In one embodiment of the present invention, a process for orienting aspherical particles comprises a combination of one or more particle orienting fields acting on particles with one or more particle orientation properties.

Figure 20A:
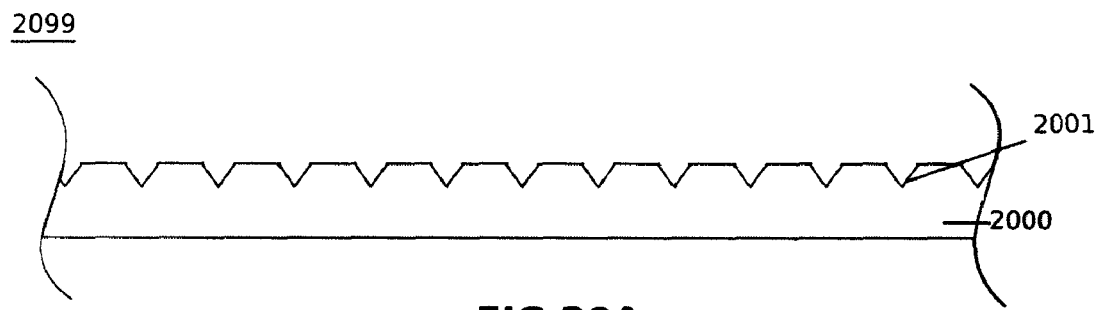
FIG. 20A illustrates a block diagram of an exemplary mold, for orienting aspherical particles in a light guide, according to one embodiment.

FIG. 20A illustrates a block diagram of an exemplary mold 2099 for orienting aspherical particles in a light guide, according to one embodiment. A mold 2000 is made from a transparent material, such as glass or transparent plastic, having many depressions such as 2001 in at least one of its surfaces. The mold itself may be cast together with the surface depressions. Alternatively, depressions may be formed on a sheet of the material of the mold 2000 by machining methods such as hammering or drilling or other industrial methods.

Figure 20B:
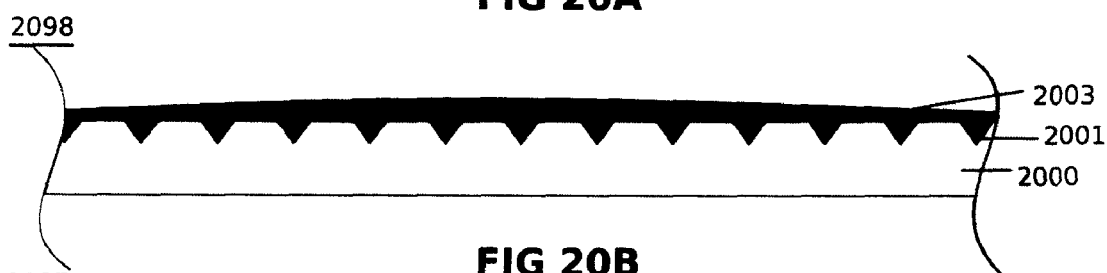
FIG. 20B illustrates a block diagram of an exemplary particle mold with a coating, according to one embodiment.

FIG. 20B illustrates a block diagram of an exemplary particle mold 2098 with a coating 2003, according to one embodiment. A coating 2003 is placed on the surface of the mold 2000 having depressions 2001. The aspherical particles are made from the coating 2003. Coating material 2003 may metallic, organic, or other powder, or pigment, which reflects light incident on it. Alternatively, the coating material may be constituted of transparent material which disperses light by refraction, reflection at the boundary, by diffusion inside the material, or by total internal reflection. Coating 2003 may be done by various methods including casting, chemical deposition, electrochemical deposition, chemical vapor deposition, physical vapor deposition, sputtering spin coating and other film deposition and formation, coating and plating methods.

Figure 20C:
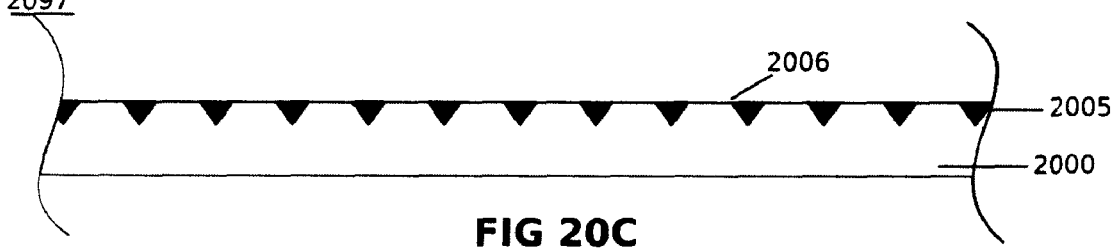
FIG. 20C illustrates a block diagram of an exemplary mold with aspherical particles, according to one embodiment.

FIG. 20C illustrates a block diagram of an exemplary mold 2097 with aspherical particles, according to one embodiment. The excess coating 2003 on the coated surface is removed. This may be done using various methods such as polishing including chemical-mechanical polishing. The polishing exposes the original surface of the mold, and a small part of the surface of the mold 2000 may also get polished away in the process. This leaves small particles such as 2005 embedded in the surface of the mold.

Figure 20D:
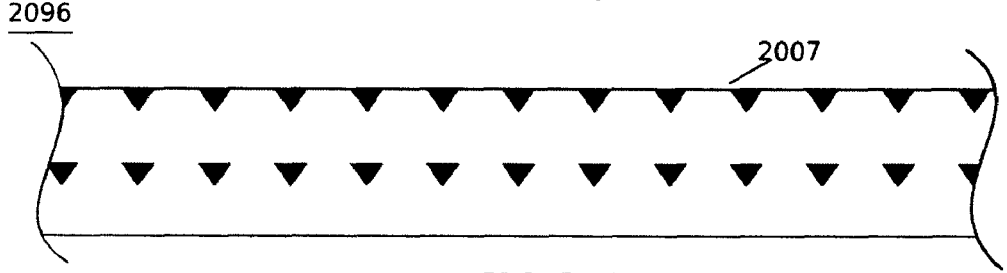
FIG. 20D illustrates a block diagram of an exemplary stacked particle mold, according to one embodiment.

FIG. 20D illustrates a block diagram of an exemplary stacked particle mold 2096, according to one embodiment. Several molds with embedded particles in them, such as the mold 2006, are stacked one above the other. In an embodiment, this stack 2007 is created by cementing many molds with embedded particles using transparent adhesives.

In an alternate embodiment, a mold such as mold 2000 is created on top of a mold such as mold 2006 as a new layer. This new layer may be created separately and glued or fused into the earlier layer, or may be created directly on top of the first layer by manufacturing processes such as deposition, casting, polymerization, etc. The new layer becomes a mold with embedded particles in it. This process is repeated to produce a stack of molds with embedded particles in them.

Figure 20E:
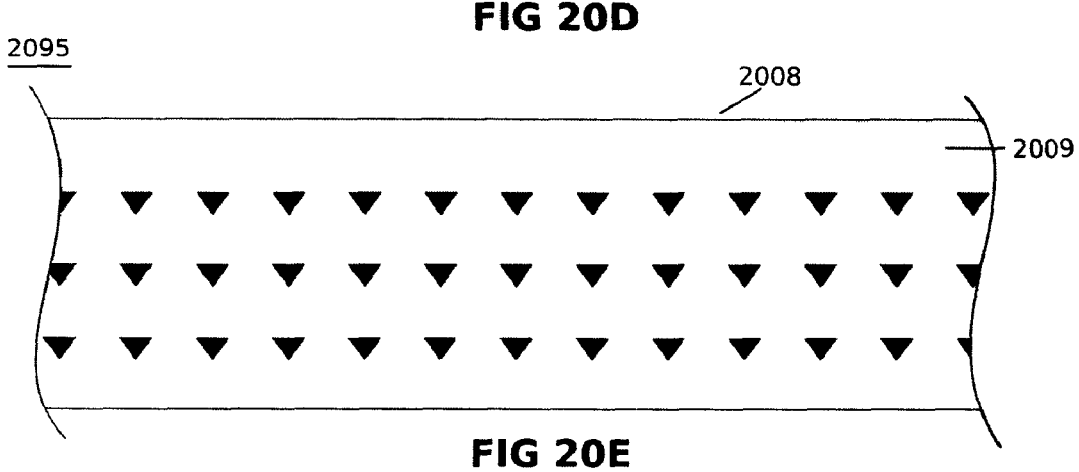
FIG. 20E illustrates block diagram of an exemplary light guide with stacked aspherical particles, according to one embodiment.

FIG. 20E illustrates block diagram of an exemplary light guide 2095 with stacked aspherical particles, according to one embodiment. After a stack of several molds with embedded particles is created, a final layer of a transparent sheet 2009 is added into the stack. The final transparent layer may be attached as described in conjunction with creation of the stack in FIG. 20D. The stack together acts as a light guide with embedded particles oriented in a particular direction. The shape and size of aspherical particles and their orientation may be changed by changing mold parameters.

Figure 21A:
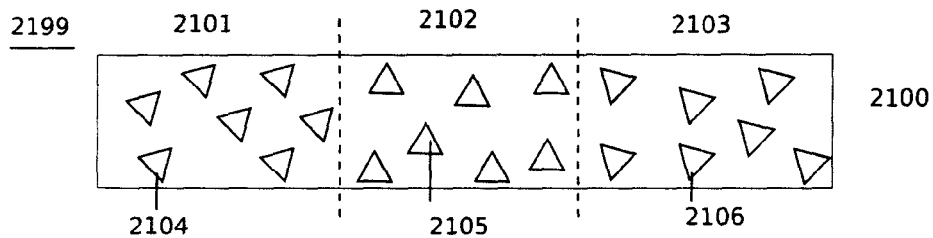
FIG. 21A illustrates a block diagram of an exemplary light guide with parts of the light guide containing aspherical particles at different orientations, according to one embodiment.

FIG. 21A illustrates a block diagram of an exemplary light guide 2199 with parts of the light guide containing aspherical particles at different orientations, according to one embodiment. Different parts of the light guide 2100 (2101, 2102 and 2103) contain aspherical particles 2104, 2105 and 2106 respectively oriented along different directions.

In another embodiment, light guide 2100 has many sections which contain aspherical particles oriented along different directions.

Figure 21B:
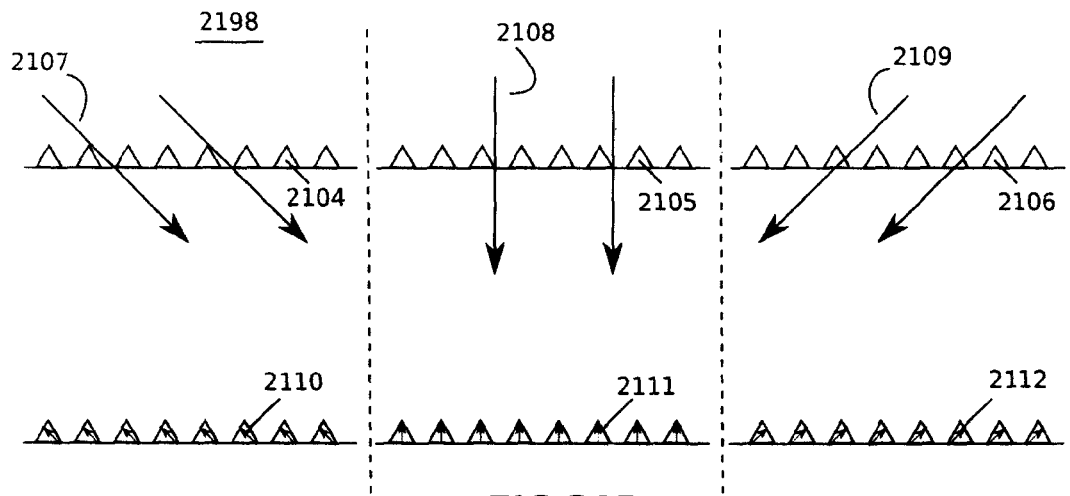
FIG. 21B illustrates a block diagram of an exemplary particle distribution for generating different orientations of aspherical particles in different regions of the light guide, according to an embodiment.

FIG. 21B illustrates a block diagram of an exemplary particle distribution 2198 for generating different orientations of aspherical particles in different regions of the light guide, according to an embodiment. Aspherical particles are made to fall on a flat surface in such a way that they are oriented in the same direction. Different sections of the flat surface on which the aspherical particles are placed are subjected to different magnetic fields according to the required orientation direction of the aspherical particles in that region. Aspherical particles 2104, in one region, are subject to a magnetic field 2107 in a particular direction. Likewise, aspherical particles 2105 and 2106 are subjected to magnetic fields 2108 and 2109 respectively according to their required orientation directions.

In another embodiment, the aspherical particles are pre-magnetized in batches, one after another.

The magnetizing fields 2107, 2108 and 2109 premagnetize particles 2104, 2105 and 2106 respectively to give premagnetized particles 2110, 2111 and 2112 respectively such that each group of particles is premagnetized in a particular required direction.

Figure 21C:
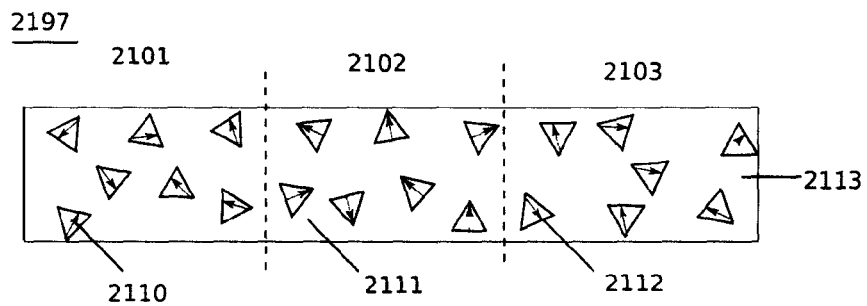
FIG. 21C illustrates a block diagram of premagnetized aspherical particles in different parts of a light guide, according to one embodiment.

FIG. 21C illustrates a block diagram 2197 of premagnetized aspherical particles in different parts of a light guide, according to one embodiment. FIG. 21C illustrates different orientations of aspherical particles in different parts of the light guide. Premagnetized aspherical particles 2110, 2111 and 2112 are dispersed into a base material of a light guide 2113. Aspherical particles, premagnetized in particular directions, are dispersed in corresponding regions 2101, 2102 and 2103 of the base material 2113.

Figure 21D:
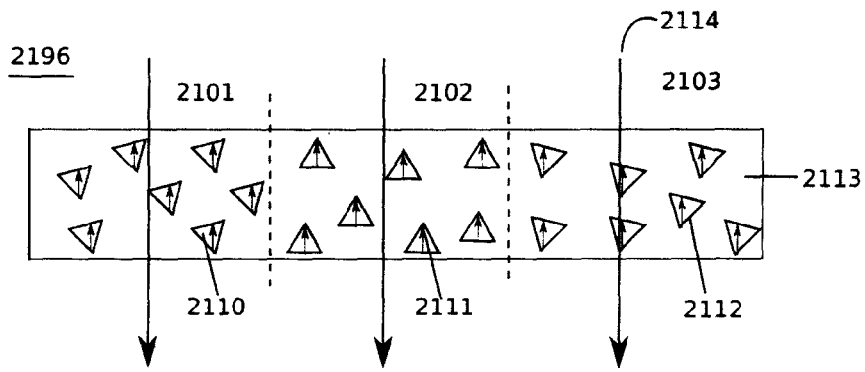
FIG. 21D illustrates a block diagram of an exemplary light guide under a magnetic field, according to one embodiment.

FIG. 21D illustrates a block diagram of an exemplary light guide 2196 under a magnetic field, according to one embodiment. FIG. 21D illustrates different orientations of aspherical particles in different parts of the backlight. The light guide base material 2113 is subjected to a magnetic field 2114. The applied magnetic field 2114 and the magnetic field of the premagnetized particles interact. Since the premagnetization directions in different regions are different, a force acts on the particles so as to orient them in different directions depending on which region they belong to. Light guide 2113 is solidified so as to fix particle positions to achieve a permanent state wherein the different parts of the light guide contain aspherical particles in the required directions.

In another embodiment, the light guide 2113 consists of many regions in which different aspherical particle orientation exists.

The emanation pattern of a light guide is a function of the direction of light illuminating it among many other parameters. The direction of light incident on the light guide may be controlled. In an embodiment, the light incident into a light guide is produced using directional diodes such as laser diodes. In another embodiment, the light input to a light guide is focused using lenses, micro lens arrays, prism sheets or collimating sheets. In another embodiment, the light input to a light guide is given from a secondary light guide containing suitably oriented aspherical particles which direct light as required into the light guide. In another embodiment, one or more of the methods mentioned above are combined to produce directional traveling light which is fed to the light guide.

Concentration of Particles

FIG. 1A discuses a light guide in the form of a sheet with light diffusing particles in it, according to one embodiment. The light guide sheet diffuses light from a light source such that the diffused light has a preferred light emanation pattern.

The light emanation pattern may be the same at different parts of the light guide sheet, or it may be different in different parts of the light guide sheet. The emanation pattern of light emanating out of a particular part of the light guide sheet depends not only on the shape and orientation of the particles, but also on the concentration of the particles in that part as well as the concentration of the particles in other parts of the light guide sheet. In one embodiment to achieve a certain setting of light emanation patterns over the light guide, the concentration of light diffusing particles is adjusted as a function of position in the light guide. Such a function relating concentration of particles to the position in the light guide is henceforth referred to as the concentration profile of particles.

Figure 22:
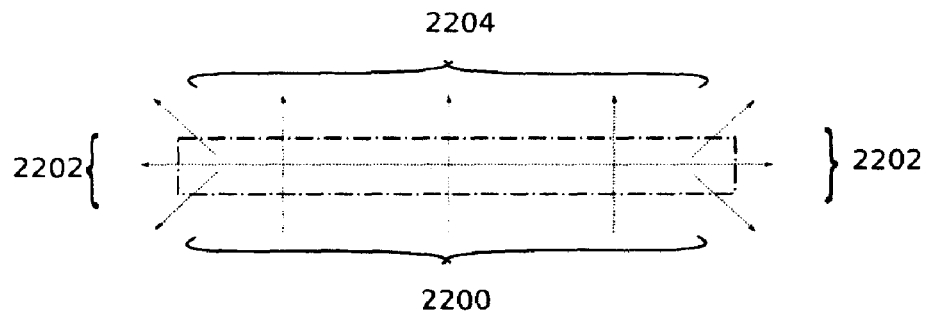
FIG. 22 illustrates a block diagram of an exemplary element of a core of an exemplary light source in the form of a surface, according to one embodiment.

FIG. 22 illustrates a block diagram of an exemplary element of a core element 2299 of an exemplary light source in the form of a surface, according to one embodiment. Core element 2299 has the thickness and breadth of the core 2204 but has a very small height. Light 2200 enters element 2299. Some of the light gets dispersed and leaves the light guide as illumination light 2202, and the remaining light 2204 travels on to the next core element. The power of the light 2200 going in is matched by the sum of the powers of the dispersed light 2202 and the light continuing to the next core element 2204. The fraction of light dispersed 2202 with respect to the light 2200 entering the core element 2299 is the photic dispersivity of core element 2299. The photic dispersivity of core element 2299 is in direct proportion to the height of core element 2299. The ratio of the photic dispersivity of core element 2299 to the height of core element 2299 is the photic dispersion density of core element 2299. As the height of core element 2299 decreases, the photic dispersion density approaches a constant. This photic dispersion density of core element 2299 bears a certain relationship to the diffuser concentration at the core element 2299. The relationship is approximated to a certain degree as a direct proportion. The relationship is determined by knowing the diffuser concentration of an element allows evaluation of the photic dispersion density of core element 2299, and vice versa.

As the height of core element 2299 is reduced, power in the emanating light 2202 reduces proportionately. The ratio of power of the emanating light 2202 to the height of core element 2299, which approaches a constant as the height of the element is reduced, is the emanated power density at core element 2299. The emanated power density at core element 2299 is the photic dispersion density times the power of the incoming light (i.e. power of light traveling through the element). The gradient of the power of light traveling through the core element 2299 is the negative of the emanated power density. These two relations give a differential equation. This equation can be represented in the form "dP/dh=−qP=−K" where:

h is the height of a core element from the primary light source edge 118

P is the power of the light being guided through that element;

q is the photic dispersion density of the element; and

K is the emanated power density at that element.

This equation is used to find the emanated power density given the photic dispersion density at each element. This equation is also used to find the photic dispersion density of each element, given the emanated power density. To design a particular light source in the form of a surface with a particular emanated power density, the above differential equation is solved to determine the photic dispersion density at each element of the light source, such as the light source 199. From this, the diffuser concentration at each core element of the core is determined. Such a core is used in a light guide, to give a light source of required emanated energy density over the surface of the light source.

If a uniform concentration of diffuser is used in the core, the emanated power density drops exponentially with height. Uniform emanated power density may be approximated by choosing a diffuser concentration such that the power drop from the edge near the light source (such as edge 118) to the opposite edge 120, is minimized. To reduce the power loss and also improve the uniformity of the emanated power, opposite edge reflects light back into the core. In an alternate embodiment, another light source sources light into the opposite edge.

To achieve uniform illumination, the photic dispersion density and hence the diffuser concentration has to be varied over the length of the core. This can be done using the above methodology. The required photic dispersion density is $q=K/(A-hK)$, where A is the power going into the core 104 and K is the emanated power density at each element, a constant number for uniform illumination. If the total height of the linear light source is H, then H times K should be less than A, i.e. total power emanated should be less than total power going into the light guide, in which case the above solution is feasible. If the complete power going into the light guide is utilized for illumination, then H times K equals A. In an exemplary light source, H times K is kept only slightly less than A, so that only a little power is wasted, as well as photic dispersion density is always finite.

Figure 23:
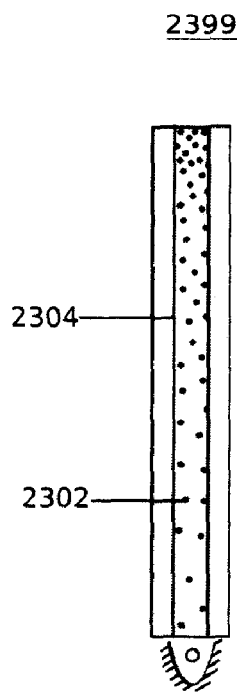
FIG. 23 illustrates a block diagram of an exemplary light source in the form of a surface having a varied concentration of diffuser particles, according to one embodiment.

FIG. 23 illustrates a block diagram of an exemplary light source in the form of a surface 2399 having a varied concentration of diffuser particles, according to one embodiment. The concentration of the diffuser particles 2302 is varied from sparse to dense from the light source end of linear light source column 2304 to the opposite edge of core 2304.

Figure 24:
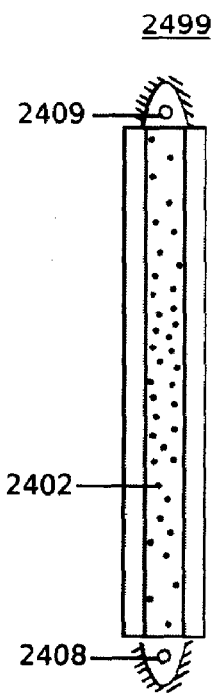
FIG. 24 illustrates a block diagram of an exemplary light source in the form of a surface having two light sources, according to one embodiment.

FIG. 24 illustrates a block diagram of an exemplary light source in the form of a surface 2499 having two light sources, according to one embodiment. By using two light sources 2408, 2409, high variations in concentration of diffuser core 2402 in the core is not necessary. The differential equation provided above is used independently for deriving the emanated power density due to each of the light sources 2408, 2409. The addition of these two power densities provides the total light power density emanated at a particular core element.

Uniform illumination for light source 2499 is achieved by photic dispersion density $q=1/\text{sqrt}((h-H/2)^2+C/K^2)$ where sqrt is the square root function, ^ stands for exponentiation, K is the average emanated power density per light source (numerically equal to half the total emanated power density at each element) and $C=A(A-HK)$.

Figure 25:
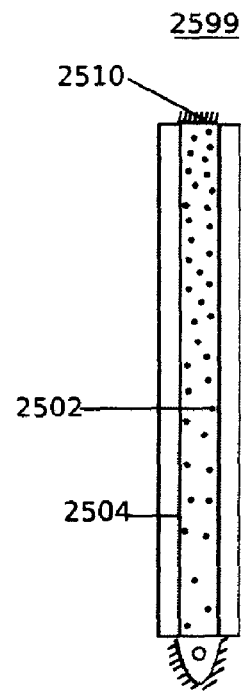
FIG. 25 illustrates a diagram of an exemplary light source in the form of a surface having a mirrored core, according to one embodiment.

FIG. 25 illustrates a diagram of an exemplary light source in the form of a surface 2599 having a mirrored core 2504, according to one embodiment. By using a mirrored core 2504, high variations in concentration of diffuser 2502 in the core 2504 is not necessary. Top edge of the core 2510 is mirrored, such that it will reflect light back into the core 2504. The photic dispersion density to achieve uniform illumination in light source 2599 is:

$$q=1/\text{sqrt}((h-H)^2+D/K^2)$$

where $D=4A(A-HK)$.

For any system described above (such as the light sources in the form of surfaces 2599, 2599 and 2599), the same pattern of emanation is sustained even if the light source power changes. For example, if the primary light source of light source 2599 provides half the rated power, each element of the core will emanate half its rated power. Specifically, a light guide core designed to act as a uniform light source as a uniform light source at all power ratings by changing the power of its light source or sources. If there are two light sources, their powers are changed in tandem to achieve this effect.

FIG. 26 illustrates a flow diagram of an exemplary process 2699 for creating a concentration profile of particles in a light guide, according to an embodiment of the present invention. Light diffusing particles are introduced into a liquid base material at a homogeneous or varying concentration (2610). The liquid base material is solidified in a controlled way (2620). Solidification is achieved by cooling the liquid, or by polymerization, or by other physical or chemical means. It is possible that the diffuser material undergoes physical or chemical change during this process. The diffuser particles undergo migration due to physical diffusion and in alternate embodiments, due to buoyant force, convection, non uniform diffusion rates and other forces. The solidifying process uses a controlled temperature or polymerization schedule, or other process such that the rate of physical diffusion of the diffuser in the base material is controlled as a function of time.

To design the initial concentration profile, i.e. the concentration profile of the particles, the physical diffusion process is approximated as a linear, location invariant system, namely a convolution operation. The final concentration profile is thus a convolution operation acting on the initial concentration profile. The initial concentration profile may be derived from the final concentration profile by deconvolution. According to one embodiment, the impulse response of the convolution operation, necessary to perform the deconvolution, is identified experimentally, or using the knowledge of the temperature schedule, or other controlled solidification process used. Because of non location-invariance at the edges, a linear but not location invariant model may be used in another embodiment. The initial concentration profile is then calculated using linear system solution methods, including matrix inversion or the least squares method.

In an embodiment, an orienting force field or a combination of orienting fields are applied during the solidification process 2620 to create an orientation distribution profile at the same time that a concentration profile is being created. In an alternate embodiment, an object is created with particles arranged in a concentration profile, but not oriented in any specific direction. Orientation of the particles is then carried out.

Light Guide Containing Multiple Kinds of Particles

In one embodiment, a light guide contains more than one different kind of aspherical particles oriented according to its respective orientation distribution profile and concentration profile such that its emanation pattern provides a predetermined emanation pattern.

Figure 27A:
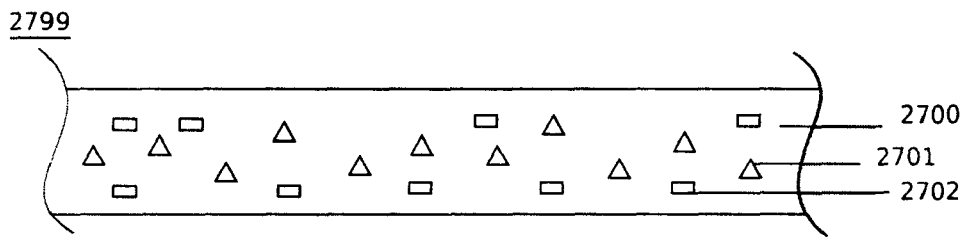
FIG. 27A illustrates a block diagram of an exemplary light guide with different kinds of aspherical particles, according to one embodiment.

FIG. 27A illustrates a block diagram of an exemplary light guide 2799 with different kinds of aspherical particles 2701 and 2702, according to one embodiment. Each kind of particle has its own emanation pattern as a function of the particle size, shape and orientation distribution among many other parameters. The emanation patterns due to different kinds of particles interact in such a way that the required emanation pattern is obtained by their coexistence.

Figure 27B:
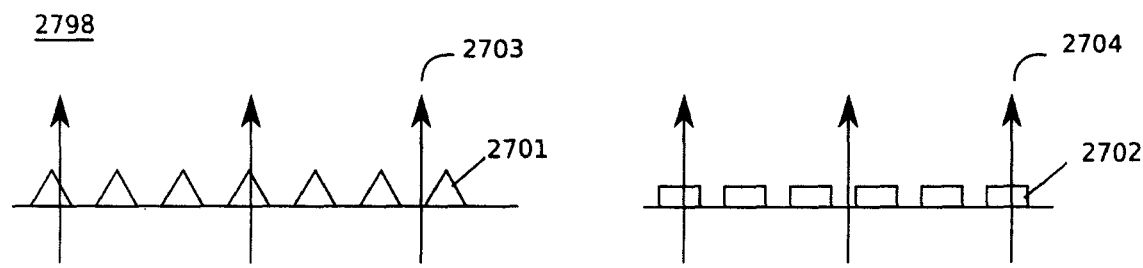
FIG. 27B illustrates a block diagram of exemplary aspherical particles oriented according to their respective orientation distribution profiles, according to one embodiment.

FIG. 27B illustrates a block diagram of exemplary aspherical particles oriented according to their respective orientation distribution profiles, according to one embodiment. Aspherical particles of different kinds 2701 and 2702, are placed on a flat surface such that they are similarly oriented. Aspherical particles 2701 are premagnetized with a particular premagnetizing field 2703 and aspherical particles 2702 are separately premagnetized according to a particular premagnetizing field 2704. Aspherical particles 2701 are magnetized in a particular direction to provide premagnetized particles 2705, and aspherical particles 2702 are magnetized to provide premagnetized particles 2706.

In another embodiment, many different kinds of aspherical particles are magnetized together or separately according to the same or different premagnetizing fields.

In another embodiment, one or many different kinds of aspherical particles are premagnetized in random directions. This may be achieved by spreading the aspherical particles on a surface with random orientations and subjecting them to a magnetic field.

Figure 27C:
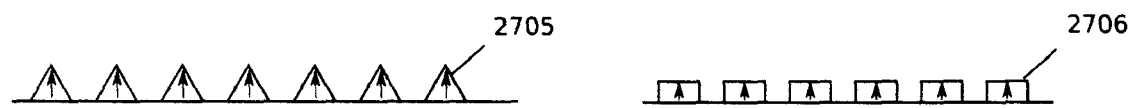
FIG. 27C illustrates a block diagram of exemplary aspherical particles oriented according to their respective orientation distribution profiles in a light guide, according to one embodiment.

FIG. 27C illustrates a block diagram of exemplary aspherical particles oriented according to their respective orientation distribution profiles in a light guide, according to one embodiment. Premagnetized aspherical particles 2705 and 2706 are dispersed inside a base material 2707 of a light guide. In an embodiment, the particles 2705 and 2706 are also distributed according to separate concentration profiles pertaining to these. The concentration profiles may be created by a diffusion process wherein the initial concentration profile of each type of particles is designed so as to give the required final concentration profile.

Figure 27D:
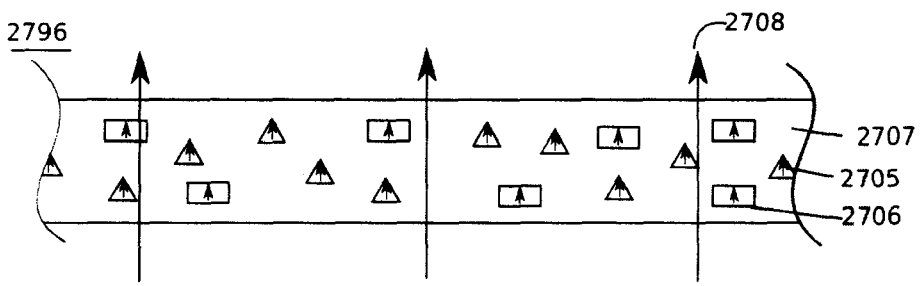
FIG. 27D illustrates a block diagram of exemplary aspherical particles oriented according to their respective orientation distribution profiles and subject to a magnetic field, according to one embodiment.

FIG. 27D illustrates a block diagram of exemplary light guide 2796 with aspherical particles oriented according to their respective orientation distribution profiles and subject to a magnetic field, according to one embodiment. The light guide base material 2707 is subjected to a magnetic field 2708. The applied magnetic field 2708 and the magnetic fields of the premagnetized particles interact and cause a force to act on the particles so as to orient them in a particular direction. Light guide 2707 is solidified so as to fix particle positions to achieve a permanent state wherein the different aspherical particles are oriented according to their required respective orientation distribution profiles.

In one embodiment, one or more properties of the aspherical particles, such as size, shape and orientation are varied randomly according to a probability distribution of sizes, shapes and orientations.

Uses

A light guide with oriented aspherical particles works as a transparent light emitting surface with a specific angular distribution. Such a light emitting surface has many uses.

One use of the present apparatus is as a source of illumination in homes, offices, factories, for photography and as a laboratory source of light. The present apparatus can be used for architectural and civil lighting (including home, office and public spaces), for photography including medical photography and for cinematography and theater. Uniform light sources are also useful as standard light sources for calibration and laboratory purposes.

One embodiment, is a light emitting surface with a narrow angle of emanation. A light emitting surface with a narrow angle of emanation can be used as a backlight for a transmissive display, giving a transmissive display with a narrow viewing angle. The display emanation can be adjusted such that light from the display is directed only to the display user and no light is directed elsewhere. Such backlight illumination enables only the display user to view the display and not allow other viewers to do so. Thus such an apparatus would facilitate display privacy. Such a display would also be highly efficient since no light is wasted in directions where a viewer is not present.

Figure 28:
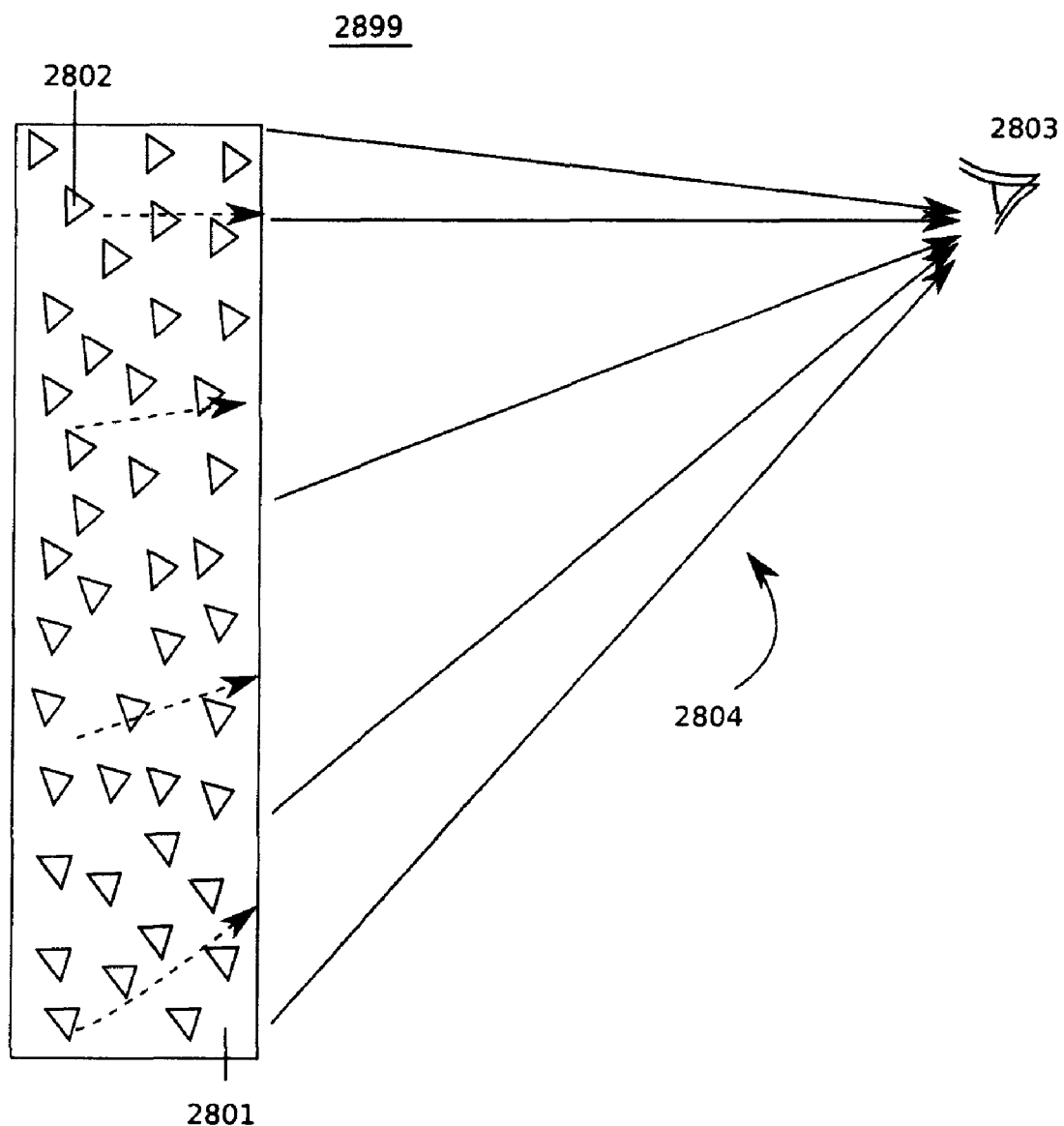
FIG. 28 illustrates an exemplary backlight with narrow viewing angle, according to one embodiment.

FIG. 28 illustrates an exemplary backlight 2899 with narrow viewing angle, according to one embodiment. Light guide 2801 is used as a backlight for a display with a narrow viewing angle. The emanation pattern 2804 of the present apparatus can be adjusted as required by adjusting the orientation of the aspherical particles 2802. The emanation pattern can also be adjusted by choosing the correct particle shapes and sizes in different parts of the light guide. In this embodiment, the emanation pattern is varied over the light guide to target all light primarily towards the eyes of the viewer.

Another embodiment uses a light emitting surface emitting light primarily out of only one of its two faces, hereforth referred to as a single sided illuminator surface.

A single sided illuminator surface may be used as a light source for photography. The transparency of the present apparatus allows a photographer to photograph an object from behind the light source, giving shadowless photos, which are of special importance in medical (especially orthodontic) photography. The single sided light emission prevents light from the light source from entering the camera.

Another use of the present apparatus is as a window which turns into a source of light when natural light is not available. A transparent single sided illuminator may be placed in place of a window, and oriented such that the light emitting face emits light indoors.

A single sided illuminator can be used as a privacy screen. When the transparent surface becomes a light source, it obscures the view through it. Similarly, a half mirror or one way glass may be augmented by a single sided transparent illuminator with emanation directed away from the half mirror, making it hard to view objects in one direction, and easy to view them in the opposite direction.

According to an embodiment, a single sided illuminator is used as a frontlight for reflective displays such as epaper and reflective LCDs. The illuminator is arranged between the reflective display and the viewer, with its emanating surface emanating light into the reflective display. Another use of the single sided illuminator is as a frontlight for hoardings, advertisements, etc.

According to an embodiment, the single sided illuminator is used as a backlight for a transmissive display. The light emanating surface emanates light towards the display. This eliminates the need of a mirror behind the backlight in a backlit display. This reduces display cost and increases efficiency. Elimination of the mirror at the back of a transmissive display improves the contrast of the transmissive display. In an embodiment, such a display becomes a part of a coaxial camera behind a display system. The absence of the mirror and transparency of the single sided illuminator allows a camera to capture an image through the display.

An apparatus and method for extraction of light from a light conducting medium in a preferred emanation pattern have been described. It is understood that the embodiments described herein are for the purpose of elucidation and should not be considered limiting the subject matter of the present patent. Various modifications, uses, substitutions, recombinations, improvements, methods of productions without departing from the scope or spirit of the present invention would be evident to a person skilled in the art.

We claim:

1. An apparatus, comprising:
   a light conducting sheet including a plurality of aspherical particles; and
   a light source placed along a narrow face of the light conducting sheet; wherein
   the light conducting sheet diffuses light generated by the light source in such a way that all light from the light emanating surface converges to a point located outside the light conducting sheet.

2. An apparatus, comprising:
   a light conducting sheet including a plurality of aspherical particles; and
   a light source placed along a narrow face of the light conducting sheet;wherein
   the light conducting sheet diffuses light generated by the light source in such away that light emanates in a predetermined light emanation pattern;
   the light is emanated primarily out of only one of the two large faces of the light conducting sheet; and
   the light conducting sheet is positioned in front of a reflective display in such a way that light from the light conducting sheet emanates into the reflective display.

3. An apparatus, comprising:
   a light conducting sheet including a plurality of aspherical particles; and
   a light source placed along a narrow face of the light conducting sheet; wherein
   the light conducting sheet diffuses light generated by the light source in such a way that substantial light from the light emanating surface converges to a small region located outside the light conducting sheet.

* * * * *